US012724568B2

(12) United States Patent
Li et al.

(10) Patent No.: US 12,724,568 B2
(45) Date of Patent: Sep. 1, 2026

(54) UNALIGNED PARTITION TRACKING IN MEMORY DEVICES

(71) Applicant: Micron Technology, Inc., Boise, ID (US)

(72) Inventors: Juane Li, San Jose, CA (US); Frederick H. Adi, Castro Valley, CA (US); Ruipeng Tao, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/914,477

(22) Filed: Oct. 14, 2024

(65) Prior Publication Data

US 2026/0104822 A1 Apr. 16, 2026

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
USPC .................................................. 711/154, 100
See application file for complete search history.

(56) References Cited

U.S. PATENT DOCUMENTS 9,021,181 B1 4/2015 Rotbard et al.
9,437,320 B1 9/2016 Nguyen et al.
11,231,863 B2 1/2022 Sheperek et al.
11,886,726 B2 1/2024 Sheperek et al.
2012/0173841 A1 7/2012 Meier et al.
2014/0286102 A1 9/2014 Wu et al.
2014/0293696 A1 10/2014 Lin et al.
2014/0334228 A1 11/2014 Kim et al.
(Continued)

FOREIGN PATENT DOCUMENTS

CN 103985415 A 8/2014
CN 110010184 A 7/2019
CN 110998735 A 4/2020

OTHER PUBLICATIONS

International Preliminary Report on Patentability for International Application No. PCT/US2020/065781, mailed Jun. 30, 2022, 7 Pages.

(Continued)

*Primary Examiner* — Hosain T Alam
*Assistant Examiner* — Zubair Ahmed
(74) *Attorney, Agent, or Firm* — Lowenstein Sandler LLP

(57) ABSTRACT

A memory sub-system includes a memory device and a processing device. The processing device is configured to: receive a read command specifying an identifier of a logical block and a page number; translate the identifier of the logical block into a physical address, the physical address comprising an identifier of a superblock and an identifier of a die; identify, based on block family metadata associated with the memory device, a superblock partition associated with the superblock, the page number, and the die; identify, based on the block family metadata, a block family associated with the superblock partition; determine a read voltage offset associated with the block family and the die; computing a modified read voltage by applying the read voltage offset to a base read level associated with the die; and read, using the modified read voltage, data from a physical page identified by the page number within the superblock.

18 Claims, 16 Drawing Sheets

(56) References Cited

U.S. PATENT DOCUMENTS

2015/0117107 A1 4/2015 Sun et al.
2015/0339057 A1 11/2015 Choi et al.
2016/0118129 A1 4/2016 Muchherla et al.
2016/0124641 A1 5/2016 Kim et al.
2016/0141042 A1 5/2016 Peterson et al.
2016/0328183 A1 11/2016 Hsieh
2017/0255403 A1 9/2017 Sharon et al.
2017/0271031 A1 9/2017 Sharon et al.
2019/0004734 A1 1/2019 Kirshenbaum et al.
2019/0130966 A1 5/2019 Danjean et al.
2019/0146671 A1 5/2019 Camp et al.
2020/0073804 A1 3/2020 Moon et al.
2020/0117590 A1 4/2020 Brandt
2020/0142799 A1 5/2020 Hiruta
2020/0152280 A1 5/2020 Muchherla et al.
2021/0026718 A1 1/2021 Huang
2021/0134378 A1 5/2021 Papandreou et al.
2021/0173577 A1 6/2021 Kale
2021/0191617 A1 6/2021 Sheperek et al.
2021/0326069 A1* 10/2021 Ish ........................ G06F 3/0659
2021/0365200 A1* 11/2021 Alwala ................. G06F 3/0604
2022/0083463 A1 3/2022 Muchherla et al.
2022/0164105 A1 5/2022 Nowell et al.
2024/0231632 A1 7/2024 Kim

OTHER PUBLICATIONS

International Search Report and Written Opinion for International Application No. PCT/US2020/065781, mailed Apr. 5, 2021, 8 Pages.

Office Action for Chinese Patent Application No. CN202110428522, mailed Dec. 14, 2023, 8 Pages.

International Search Report and Written Opinion for International Application No. PCT/US2025/050811, mailed Feb. 10, 2026, 09 Pages.

Rajab M., et al., “Read Threshold Calibration for Non-Volatile Flash Memories,” IEEE , 2019, pp. 109-113.

Office Action for Chinese Patent Application No. 202080092412.6, mailed Dec. 9, 2025, 20 Pages.

* cited by examiner

| Level/Bin | Bin 0 | Bin 1 | Bin 2 | Bin 3 | Bin 4 | Bin 5 | Bin 6 | Bin 7 |
|---|---|---|---|---|---|---|---|---|
| L1 | 0 | 0 | 0 | 0 | 0 | 0 | 0 | 1 |
| L2 | 0 | -1 | -2 | -3 | -3 | -4 | -5 | -5 |
| L3 | 0 | -2 | -3 | -4 | -5 | -6 | -7 | -8 |
| L4 | 0 | -3 | -4 | -6 | -8 | -9 | -11 | -12 |
| L5 | 0 | -3 | -5 | -7 | -9 | -11 | -13 | -15 |
| L6 | 0 | -4 | -7 | -10 | -13 | -16 | -19 | -21 |
| L7 | 0 | -6 | -11 | -16 | -20 | -25 | -30 | -34 |

| BF Superblock Table | | | | | | |
|---|---|---|---|---|---|---|
| SuperBlock | Partition | LWL | LWP | BF | Add Lun | Delete Lun |
| 0 | 0 | | | 0 | | |
| | 1 | | | 1 | | |
| | 2 | | | 2 | | |
| | 3 | | 3311 | 4 | | |
| 1 | 0 | | | 5 | | |
| | 1 | | | 6 | | |
| | 2 | | | 7 | | |
| | 3 | | 3311 | 8 | | |
| ... | ... | | ... | ... | | |
| 480 | 0 | | | 39 | | |
| | 1 | | | 40 | | |
| | 2 | | | 62 | | |
| | 3 | | 3311 | 63 | | |

820

830

Figure 10:
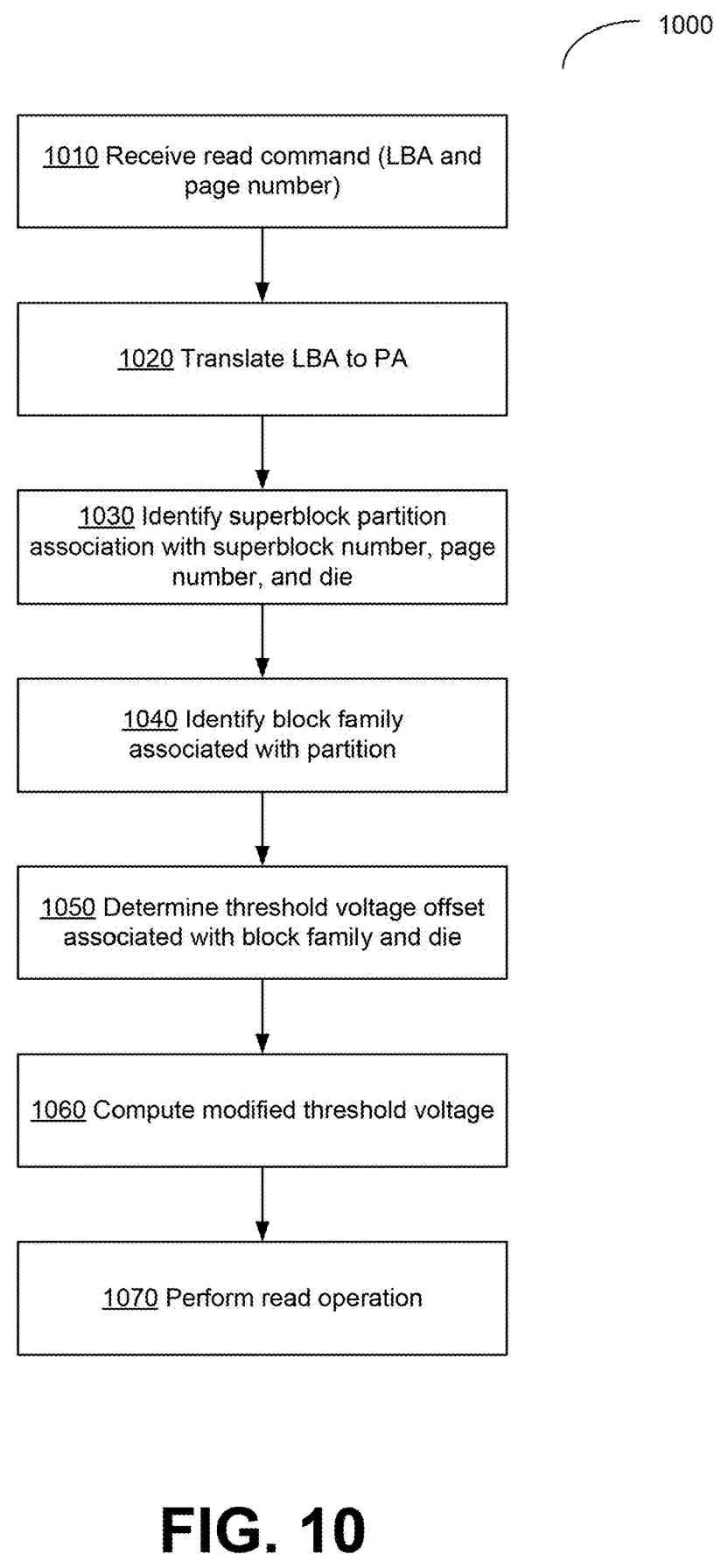

1000

1010 Receive read command (LBA and page number)

1020 Translate LBA to PA

1030 Identify superblock partition association with superblock number, page number, and die 1040 Identify block family associated with partition 1050 Determine threshold voltage offset associated with block family and die 1060 Compute modified threshold voltage 1070 Perform read operation

| | DF0 | DF1 | DF2 | DF3 | DF4 |
|---|---|---|---|---|---|
| BF0 | Bin0_0 | Bin0_1 | Bin0_2 | Bin0_3 | Bin0_4 |
| BF1 | Bin1_0 | Bin1_1 | Bin1_2 | Bin1_3 | Bin1_4 |
| | \|Bin0_0 - Bin1_0\| | \|Bin0_1 - Bin1_1\| | \|Bin0_2 - Bin1_2\| | \|Bin0_3 - Bin1_3\| | \|Bin0_4 - Bin1_4\| |

1210B

| | DF0 | DF1 | DF2 | DF3 | DF4 |
|---|---|---|---|---|---|
| BF0 | -1 | Bin0_1 | Bin0_2 | Bin0_3 | -1 |
| BF1 | Bin1_0 | -1 | Bin1_2 | Bin1_3 | -1 |
| | -1 | -1 | \|Bin0_2 - Bin1_2\| | \|Bin0_3 - Bin1_3\| | -1 |

1210C

| | DF0 | DF1 | DF2 | DF3 | DF4 |
|---|---|---|---|---|---|
| BF0 | -1 | Bin0_1 | -1 | -1 | -1 |
| BF1 | Bin1_0 | -1 | Bin1_2 | Bin1_3 | -1 |
| | -1 | -1 | -1 | -1 | -1 |

FIG. 12

UNALIGNED PARTITION TRACKING IN MEMORY DEVICES

TECHNICAL FIELD

Implementations of the disclosure are generally related to memory sub-systems, and more specifically, are related to block family-based error avoidance for memory devices.

BACKGROUND

A memory sub-system may include one or more memory devices that store data. The memory devices may be, for example, non-volatile memory devices and volatile memory devices. In general, a host system may utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some implementations of the disclosure.

FIG. 10 is a flow diagram of an example method of performing a read operation by a memory sub-system controller and/or local media controller operating in accordance with some implementations of the present disclosure.

FIG. 12 schematically illustrates voltage offset bin assignments for block families having their memory pages residing on at least partially overlapping sets of die families of the memory device or on non-overlapping sets of die families of the memory device operating in accordance with some implementations of the present disclosure.

DETAILED DESCRIPTION

Figure 1:
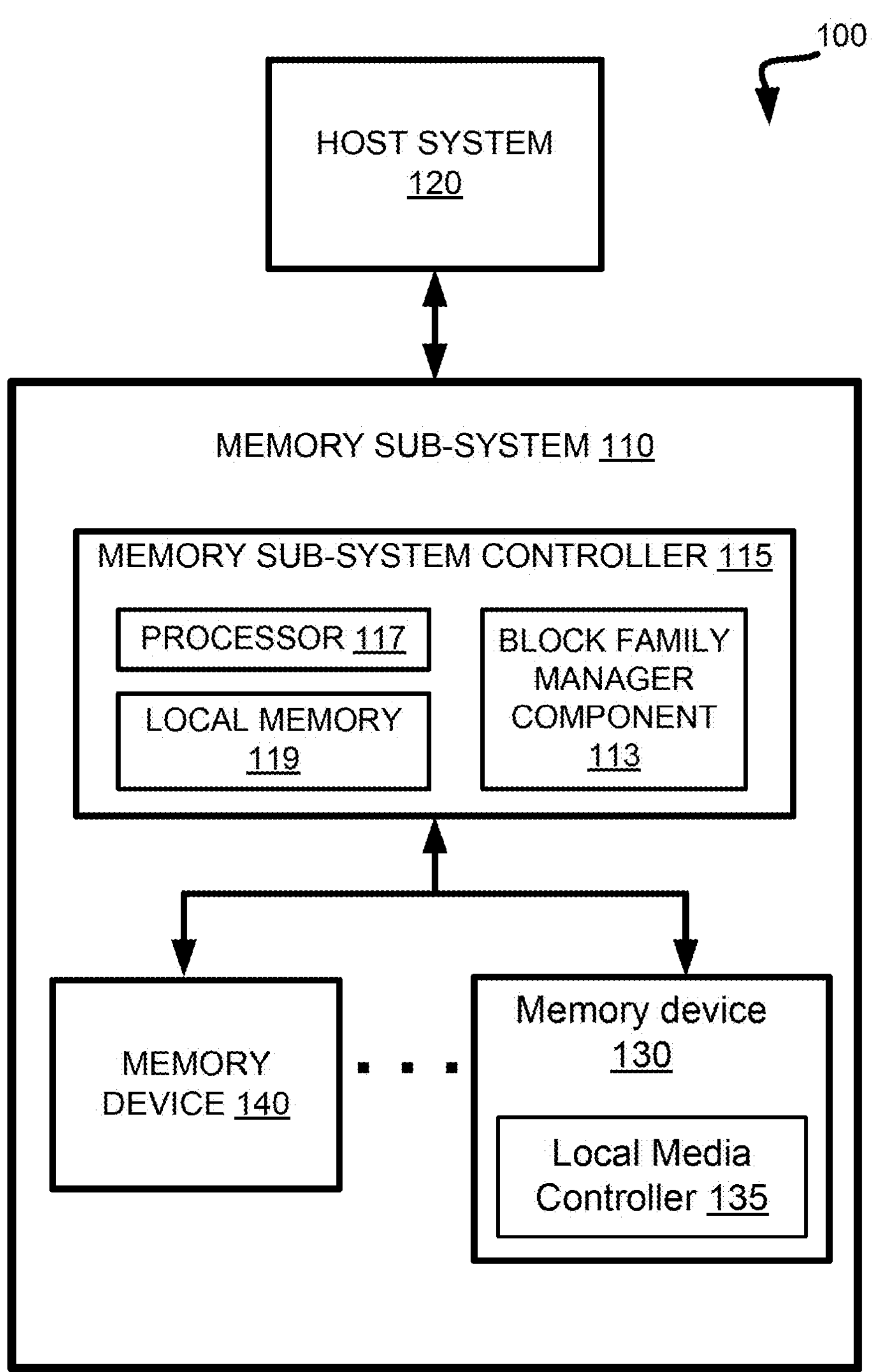
FIG. 1 illustrates an example computing system that includes a memory sub-system in accordance with some implementations of the present disclosure.

Implementations of the present disclosure are directed to unaligned partition tracking for block family-based error avoidance (BFEA) in memory devices. A memory sub-system may be a storage device, a memory module, or a hybrid of a storage device and memory module. Examples of storage devices and memory modules are described below in conjunction with FIG. 1. In general, a host system may utilize a memory sub-system that includes one or more components, such as memory devices that store data. The host system may provide data to be stored at the memory sub-system and may request data to be retrieved from the memory sub-system.

A memory sub-system may utilize one or more memory devices, including any combination of the different types of non-volatile memory devices and/or volatile memory devices, to store the data provided by the host system. In some implementations, non-volatile memory devices may be provided by negative-and (NAND) type flash memory devices. Other examples of non-volatile memory devices are described below in conjunction with FIG. 1. A non-volatile memory device is a package of one or more dies. Each die may include one or more planes. Planes may be grouped into logic units (LUNs). For some types of non-volatile memory devices (e.g., NAND devices), each plane may include a set of physical blocks. Each block may include a set of pages. Each page may include a set of memory cells ("cells"). A cell is an electronic circuit that stores information.

Data operations may be performed by the memory sub-system. The data operations may be host-initiated operations. For example, the host system may initiate a data operation (e.g., write, read, erase, etc.) on a memory sub-system. The host system may send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request may include logical address information (e.g., logical block address (LBA), namespace) for the host data, which is the location the host system associates with the host data. The logical address information (e.g., LBA, namespace) may be part of metadata for the host data. Metadata may also include error handling data (e.g., ECC codeword, parity code), data version (e.g. used to distinguish age of data written), valid bitmap (which LBAs or logical transfer units contain valid data), etc.

A memory device includes multiple memory cells, each of which may store, depending on the memory cell type, one or more bits of information. A memory cell may be programmed (written to) by applying a certain voltage to the memory cell, which results in an electric charge being held by the memory cell, thus allowing modulation of the voltage distributions produced by the memory cell. Moreover, precisely controlling the amount of the electric charge stored by the memory cell allows to establish multiple threshold voltage levels corresponding to different logical levels, thus effectively allowing a single memory cell to store multiple bits of information: a memory cell operated with $2^n$ different threshold voltage levels is capable of storing n bits of information. Thus, the read operation may be performed by comparing the measured voltage exhibited by the memory cell to one or more reference voltage levels in order to distinguish between two logical levels for single-level cells and between multiple logical levels for multi-level cells.

Due to the phenomenon known as slow charge loss, the threshold voltage of a memory cell changes in time as the electric charge of the cell is degrading, which is referred to as "temporal voltage shift" (since the degrading electric charge causes the voltage distributions to shift along the voltage axis towards lower voltage levels). The threshold voltage is changing rapidly at first (immediately after the memory cell was programmed), and then slows down in an approximately logarithmic linear fashion with respect to the time elapsed since the cell programming event. Accordingly, failure to mitigate the temporal voltage shift caused by the slow charge loss may result in the increased bit error rate in read operations.

However, various common implementations either fail to adequately address the temporal voltage shift or employ inefficient strategies resulting in high bit error rates and/or exhibiting other shortcomings. Implementations of the present disclosure address the above-noted and other deficiencies by implementing a memory sub-system that employs block family based error avoidance strategies, thus significantly improving the bit error rate exhibited by the memory sub-system.

In accordance with implementations of the present disclosure, the temporal voltage shift is selectively tracked for programmed blocks grouped by block families, and appropriate voltage offsets, which are based on block affiliation with a certain block family, are applied to the base read levels in order to perform read operations. "Block family" herein shall refer to a group of full or partial superblocks (the latter referred to as "partitions" herein) that have been programmed within a specified time window and a specified temperature window. "Superblock" herein shall refer to a set of blocks having the same block number but residing on different dies of the memory device. For example, superblock number i would include all blocks number i across all dies of the memory device. Similarly, "superpage" herein shall refer to a set of pages having the same page number but residing on different dies of the memory device. For example, superpage number j of superblock number i would include all pages number j across all blocks of superblock number i. A partition may include a set of superpages organized into one or more page stripes. In some implementations, an incomplete page stripe (e.g., the last page stripe of a partition) may be padded by a predefined data pattern. Alternatively, no padding for partial page stripes may be allowed due to application-specific requirements. Accordingly, some superblock partitions may include partial pages stripes.

Since the time elapsed after programming and temperature are the main factors affecting the temporal voltage shift, all superblocks and/or partitions within a single block family are presumed to exhibit similar distributions of threshold voltages in memory cells, and thus would require the same voltage offsets to be applied to the base read levels for read operations. "Base read level" herein shall refer to the initial threshold voltage level exhibited by the memory cell immediately after programming. In some implementations, base read levels may be stored in the metadata of the memory device.

Block families may be created asynchronously with respect to memory programming operations. In an illustrative example, a new block family may be created whenever a specified period of time (e.g., a predetermined number of minutes) has elapsed since creation of the currently active block family or the reference temperature of the memory device (e.g., measured at a particular die) has changed by more than a specified threshold value. The memory sub-system controller may maintain an identifier of the active block family, which is associated with one or more superblocks as they are being programmed.

The memory sub-system controller may periodically perform a scan process in order to associate each die of every block family with one of the predefined voltage offset bins, which is in turn associated with the voltage offset to be applied for read operations. The associations of superblock partitions with block families and block families and dies with voltage offset bins may be stored in respective metadata tables maintained by the memory sub-system controller.

Accordingly, upon receiving a read command, the memory sub-system controller may identify the block family associated with the memory block identified by the logical block address (LBA) specified by the read command, identify the voltage offset bin associated with the block family and die on which the block resides, compute the new read voltage by additively applying the read voltage offset associated with the voltage offset bin to the base read level, and perform the read operation using the new threshold voltage.

In some implementations, associations of superblock partitions with block families may be maintained by a superblock table, which may store, for each partition of each superblock, identifier of the block family associated with that partition. However, as noted herein above, in some implementations, superblock partitions may not be aligned with page stripes. Accordingly, the superblock table may also store, for each partition of each superblock, the identifiers (e.g., numbers) of the last written page and the last written die (also referred to as "logical unit"), thus accommodating superblock partitions that are not aligned with page stripes.

Furthermore, a situation may occur when one portion of a page stripe belongs to one partition, while another portion of the page stripe including the redundancy metadata page belongs to another partition. In order to accommodate such situations, the superblock table may also store, for each partition of each superblock, an excluded logical unit number (LUN) identifying a logical unit (e.g., a die) that is excluded from the partition and an additional LUN identifying a logical unit (e.g., a die) that is added to the partition.

In some implementations, two block families that satisfy a similarity criterion may be merged, thus eliminating the need to maintain redundant metadata and reducing the number of scan operations. In an illustrative example, the block family similarity criterion may specify a threshold value of a chosen similarity metric. The similarity metric may reflect (i.e., may be produced by a predefined mathematical transformation from) the differences between the calibrated values of the read voltage offsets for all die families of the memory device. In an illustrative example, the similarity metric reflects the maximum, across all die families of the memory device, pairwise difference between the calibrated values of the read voltage offsets associated with each of the block families for each die family of the memory device. Accordingly, if a value of the chosen similarity metric for two given block families does not exceed the chosen similarity threshold, the two block families may be merged, as described in more detail herein below.

As noted herein above, the memory sub-system controller may periodically perform scan operations in order to associate each die of every block family with one of the predefined voltage offset bins, which is in turn associated with the voltage offset to be applied for read operations. The scan operations may involve performing, with respect to at least a subset of blocks of a selected superblock partition of a chosen block family, read operations utilizing different read voltage offsets, and choosing the read voltage offset that minimizes the error rate of the read operation.

In some implementations, the scan operations are performed periodically (e.g., triggered by a timer) and, for each voltage offset bin of a set of voltage offset bins maintained by the memory device, a predefined number of the oldest (i.e., least recently closed) block families associated with that voltage offset bin are selected for the scan iteration.

From a selected block family, one or more superblock partitions may be selected for scanning. If the selected block family has no single superblock partition that would cover all die families of the selected block family, a combination of two or more superblock partitions may be selected for scanning. Accordingly, the memory sub-system controller may iterate through all possible combinations of superblock partitions that are associated with the selected block family in order to identify a combination of two or more superblock partitions may be selected for scanning, such that the union of die families of the selected superblock partitions would include all the die families of the selected block family, as described in more detail herein below.

Therefore, advantages of the systems and methods implemented in accordance with some implementations of the present disclosure include, but are not limited to, improving the bit error rate in read operations by maintaining metadata that tracks groups of memory blocks ("block families") that are presumed to exhibit similar voltage distributions, as described in more detail herein below.

FIG. 1 illustrates an example computing system 100 that includes a memory sub-system 110 in accordance with some implementations of the present disclosure. The memory sub-system 110 may include media, such as one or more volatile memory devices (e.g., memory device 140), one or more non-volatile memory devices (e.g., memory device 130), or a combination of such.

A memory sub-system 110 may be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 may be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device (e.g., a processor).

The computing system 100 may include a host system 120 that is coupled to one or more memory sub-systems 110. In some implementations, the host system 120 is coupled to different types of memory sub-systems 110. FIG. 1 illustrates one example of a host system 120 coupled to one memory sub-system 110. As used herein, "coupled to" or "coupled with" generally refers to a connection between components, which may be an indirect communicative connection or direct communicative connection (e.g., without intervening components), whether wired or wireless, including connections such as electrical, optical, magnetic, etc.

The host system 120 may include a processor chipset and a software stack executed by the processor chipset. The processor chipset may include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 may be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), etc. The physical host interface may be used to transmit data between the host system 120 and the memory sub-system 110. The host system 120 may further utilize an NVM Express (NVMe) interface to access components (e.g., memory devices 130) when the memory sub-system 110 is coupled with the host system 120 by the PCIe interface. The physical host interface may provide an interface for passing control, address, data, and other signals between the memory sub-system 110 and the host system 120. FIG. 1 illustrates a memory sub-system 110 as an example. In general, the host system 120 may access multiple memory sub-systems via a same communication connection, multiple separate communication connections, and/or a combination of communication connections.

The memory devices 130, 140 may include any combination of the different types of non-volatile memory devices and/or volatile memory devices. The volatile memory devices (e.g., memory device 140) may be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory may perform bit storage based on a change of bulk resistance, in conjunction with a stackable cross-gridded data access array. Additionally, in contrast to many flash-based memories, cross-point non-volatile memory may perform a write in-place operation, where a non-volatile memory cell may be programmed without the non-volatile memory cell being previously erased. NAND type flash memory includes, for example, two-dimensional NAND (2D NAND) and three-dimensional NAND (3D NAND).

Each of the memory devices 130 may include one or more arrays of memory cells. One type of memory cell, for example, single level cells (SLC) may store one bit per cell. Other types of memory cells, such as multi-level cells (MLCs), triple level cells (TLCs), and quad-level cells (QLCs), may store multiple bits per cell. In some implementations, each of the memory devices 130 may include one or more arrays of memory cells such as SLCs, MLCs, TLCs, QLCs, or any combination of such. In some implementations, a particular memory device may include an SLC portion, and an MLC portion, a TLC portion, or a QLC portion of memory cells. The memory cells of the memory devices 130 may be grouped as pages that may refer to a logical unit of the memory device used to store data. With some types of memory (e.g., NAND), pages may be grouped to form blocks.

Although non-volatile memory devices such as 3D cross-point array of non-volatile memory cells and NAND type memory (e.g., 2D NAND, 3D NAND) are described, the memory device 130 may be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) may communicate with the memory devices 130 to perform operations such as reading data, writing data, or erasing data at the memory devices 130 and other such operations. The memory sub-system controller 115 may include hardware such as one or more integrated circuits and/or discrete components, a buffer memory, or a combination thereof. The hardware may include digital circuitry with dedicated (i.e., hard-coded) logic to perform the operations described herein. The memory sub-system controller 115 may be a microcontroller, special purpose logic circuitry (e.g., a field programmable gate array (FPGA), an application specific integrated circuit (ASIC), etc.), or other suitable processor.

The memory sub-system controller 115 may include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some implementations, the local memory 119 may include memory registers storing memory pointers, fetched data, etc. The local memory 119 may also include read-only memory (ROM) for storing micro-code. While the example memory sub-system 110 in FIG. 1 has been illustrated as including the controller 115, in another implementation of the present disclosure, a memory sub-system 110 does not include a controller 115, and may instead rely upon external control (e.g., provided by an external host, or by a processor or controller separate from the memory sub-system).

In general, the memory sub-system controller 115 may receive commands or operations from the host system 120 and may convert the commands or operations into instructions or appropriate commands to achieve the desired access to the memory devices 130. The memory sub-system controller 115 may be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 may further include host interface circuitry to communicate with the host system 120 via the physical host interface. The host interface circuitry may convert the commands received from the host system into command instructions to access the memory devices 130 as well as convert responses associated with the memory devices 130 into information for the host system 120.

In some implementations, memory sub-system 110 may use a striping scheme, according to which every the data payload (e.g., user data) utilizes multiple dies of the memory devices 130 (e.g., NAND type flash memory devices), such that the payload is distributed through a subset of dies, while the remaining one or more dies are used to store the error correction information (e.g., parity bits). Accordingly, a set of blocks distributed across a set of dies of a memory device using a striping scheme is referred herein to as a "superblock."

The memory sub-system 110 may also include additional circuitry or components that are not illustrated. In some implementations, the memory sub-system 110 may include a cache or buffer (e.g., DRAM) and address circuitry (e.g., a row decoder and a column decoder) that may receive an address from the controller 115 and decode the address to access the memory devices 130.

In some implementations, the memory devices 130 include local media controllers 135 that operate in conjunction with memory sub-system controller 115 to execute operations on one or more memory cells of the memory devices 130. An external controller (e.g., memory sub-system controller 115) may externally manage the memory device 130 (e.g., perform media management operations on the memory device 130). In some implementations, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a block family manager 113 that may be used to implement the BFEA techniques in accordance with implementations of the present disclosure. In some implementations, the controller 115 implements at least some functions of the block family manager 113. For example, the controller 115 may include a processor 117 (processing device) configured to execute instructions stored in local memory 119 for performing the operations described herein. In some implementations, the local media controllers 135 implement at least some functions of the block family manager 113. In some implementations, the host system 120 implements at least some functions of the block family manager 113. The block family manager 113 may manage block families associated with the memory devices 130, as described in more detail herein below.

Figure 2:
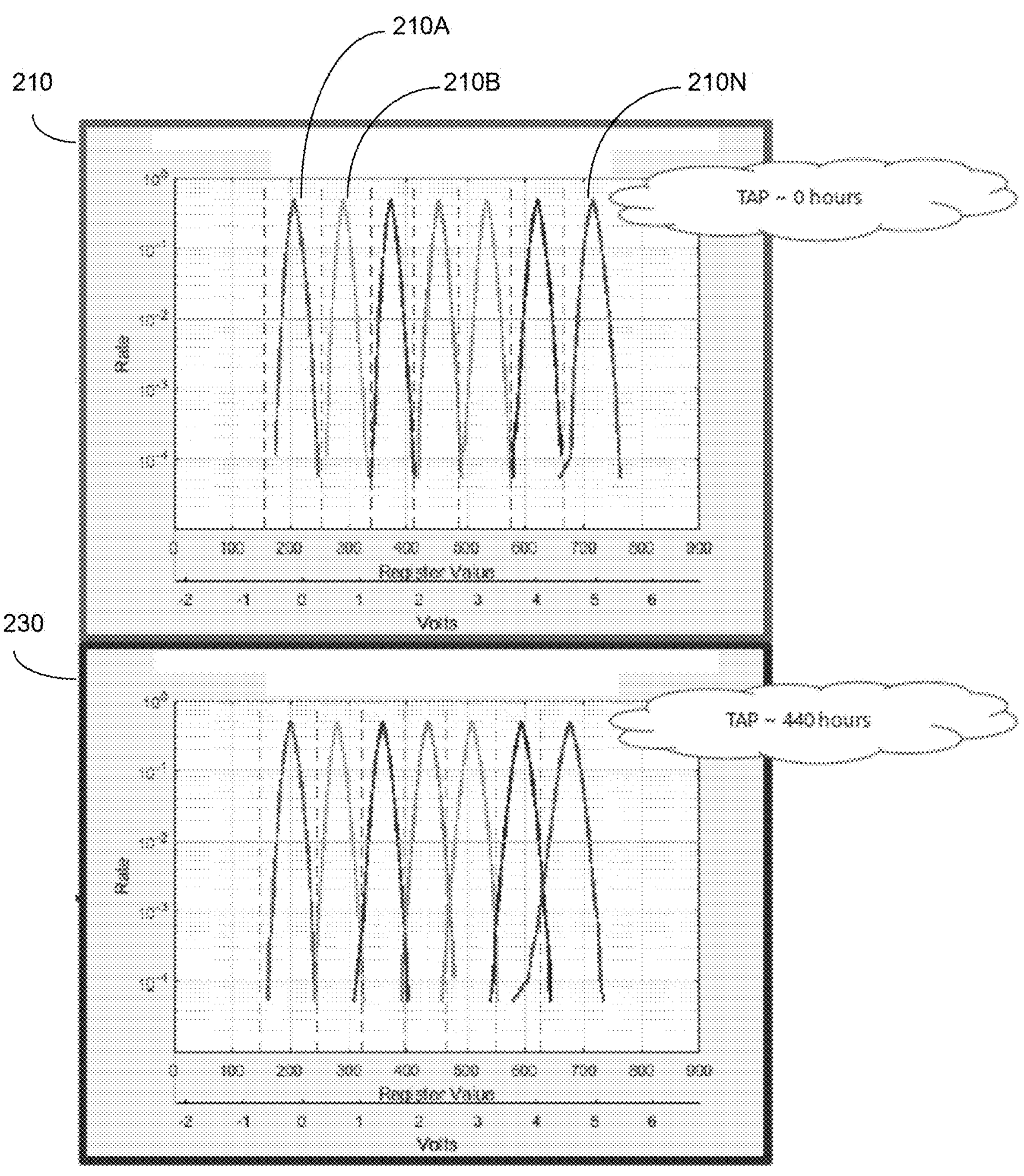
FIG. 2 schematically illustrates the temporal voltage shift caused by the slow charge loss exhibited by triple-level memory cells, in accordance with some implementations of the present disclosure.

FIG. 2 schematically illustrates the temporal voltage shift caused by the slow charge loss exhibited by triple-level memory cells. While the illustrative example of FIG. 2 utilizes triple-level cells, the same observations may be made and, accordingly, the same remedial measures are applicable to single level cells and multi-level cells in order to compensate for the slow charge loss. As noted herein above, a memory cell may be programmed (written to) by applying a certain voltage to the memory cell, which results in an electric charge being held by the memory cell, thus allowing modulation of the voltage distributions produced by the memory cell. Precisely controlling the amount of the electric charge stored by the memory cell allows to establish multiple threshold voltage levels corresponding to different logical levels, thus effectively allowing a single memory cell to store multiple bits of information: a memory cell operated with 2n different threshold voltage levels is capable of storing n bits of information.

In FIG. 2, each graph 220A-220N shows a voltage distribution produced by memory cells programmed by a respective write level (which may be assumed to be at the midpoint of the distribution) to encode a corresponding logical level ("000" through "111" in case of a TLC). In order to distinguish between neighboring distributions (corresponding to two different logical levels), the read voltage levels (shown by dashed vertical lines) are defined.

As seen from comparing example charts 210 and 230, which reflect the time periods immediately after programming and 440 hours after programming, respectively, the voltage distributions change in time due to the slow charge loss. In various implementations of the present disclosure, the temporal voltage shift is selectively tracked for programmed blocks grouped by block families, and appropriate voltage offsets, which are based on block affiliation with a certain block family, are applied to the base read levels in order to perform read operations.

Figure 3:
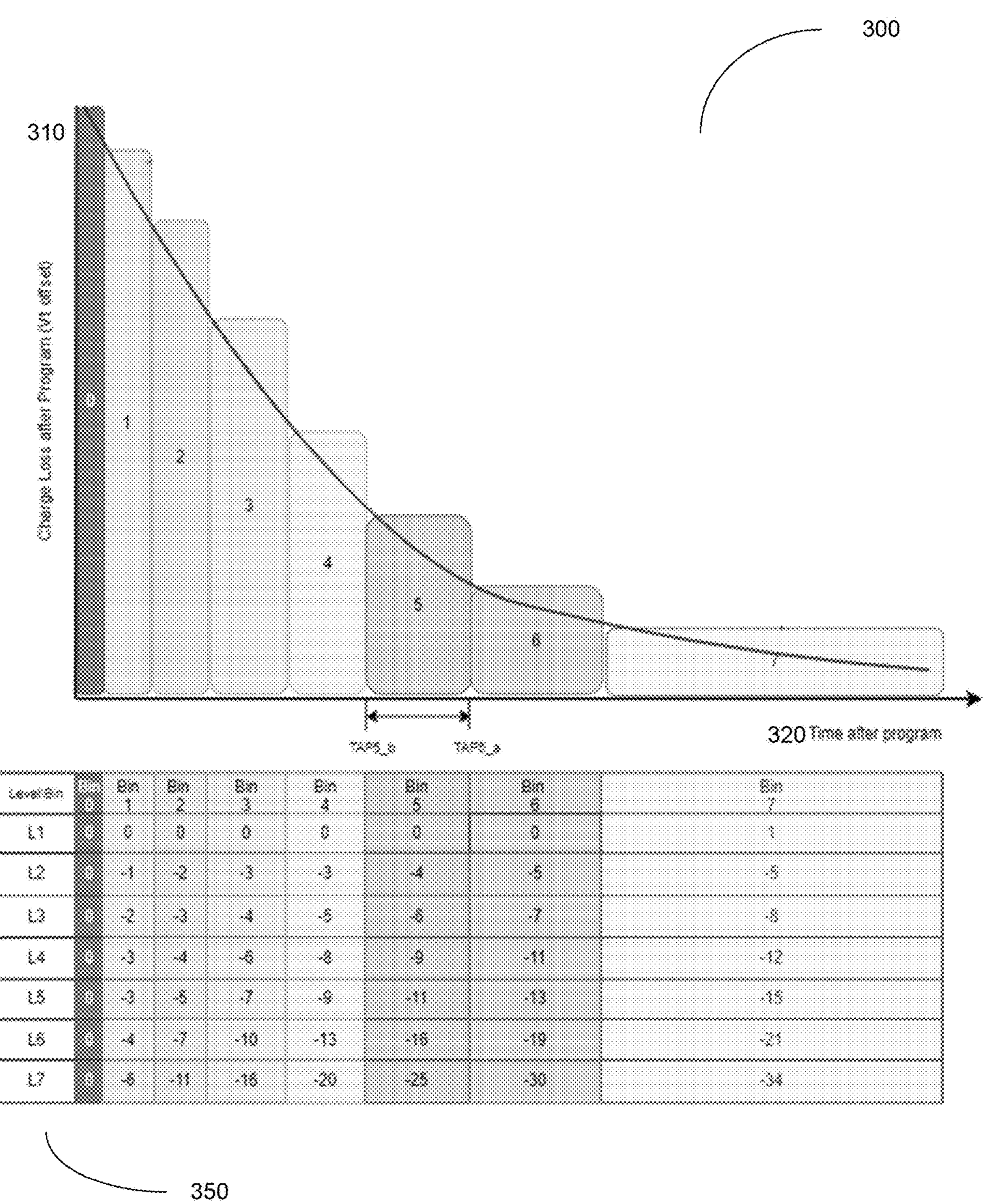
FIG. 3 depicts an example graph illustrating the dependency of the read voltage offset on the time after program (i.e., the period of time elapsed since the block had been programmed), in accordance with some implementations of the present disclosure.

FIG. 3 depicts an example graph 300 illustrating the dependency of the read voltage offset 310 on the time after program 320 (i.e., the period of time elapsed since the block had been programmed). As noted herein above, blocks of the memory device are grouped into block families, such that each block family includes one or more full or partial superblocks that have been programmed within a specified time window and a specified temperature window. Since the time elapsed after programming and temperature are the main factors affecting the temporal voltage shift, all superblocks and/or partitions within a single block family are presumed to exhibit similar distributions of threshold voltages in memory cells, and thus would require the same voltage offsets for read operations.

Block families may be created asynchronously with respect to memory programming events. In an illustrative example, the memory sub-system controller 115 of FIG. 1 may create a new block family whenever a specified period of time (e.g., a predetermined number of minutes) has elapsed since creation of the current block family or whenever the reference temperature of memory cells, which is updated at specified time intervals, has changed by more than a specified threshold value since creation of the current block family.

A newly created block family that includes recently programmed blocks may be associated with bin 0. Then, as block families "age," they move to higher bins (e.g., bins 0-7 in the illustrative example of FIG. 3). The bin assignment process may be facilitated by the memory sub-system controller periodically performing a scan process in order to associate each die family of every block family with one of the predefines voltage offset bins, which is in turn associated, by the bin offset table 350, with the voltage offset to be applied for read operations.

The bin offset table 350 is indexed by the combination of bin number and logical programming level (e.g., L1-L7). Accordingly, a given line of the bin offset table 350 specifies the read voltage offset associated with the combination of the bin number and the logical programming level that are referenced by the given line.

The associations of blocks with block families and block families and die families with voltage offset bins may be stored in respective metadata tables maintained by the memory sub-system controller, as described in more detail herein below.

Figure 4:
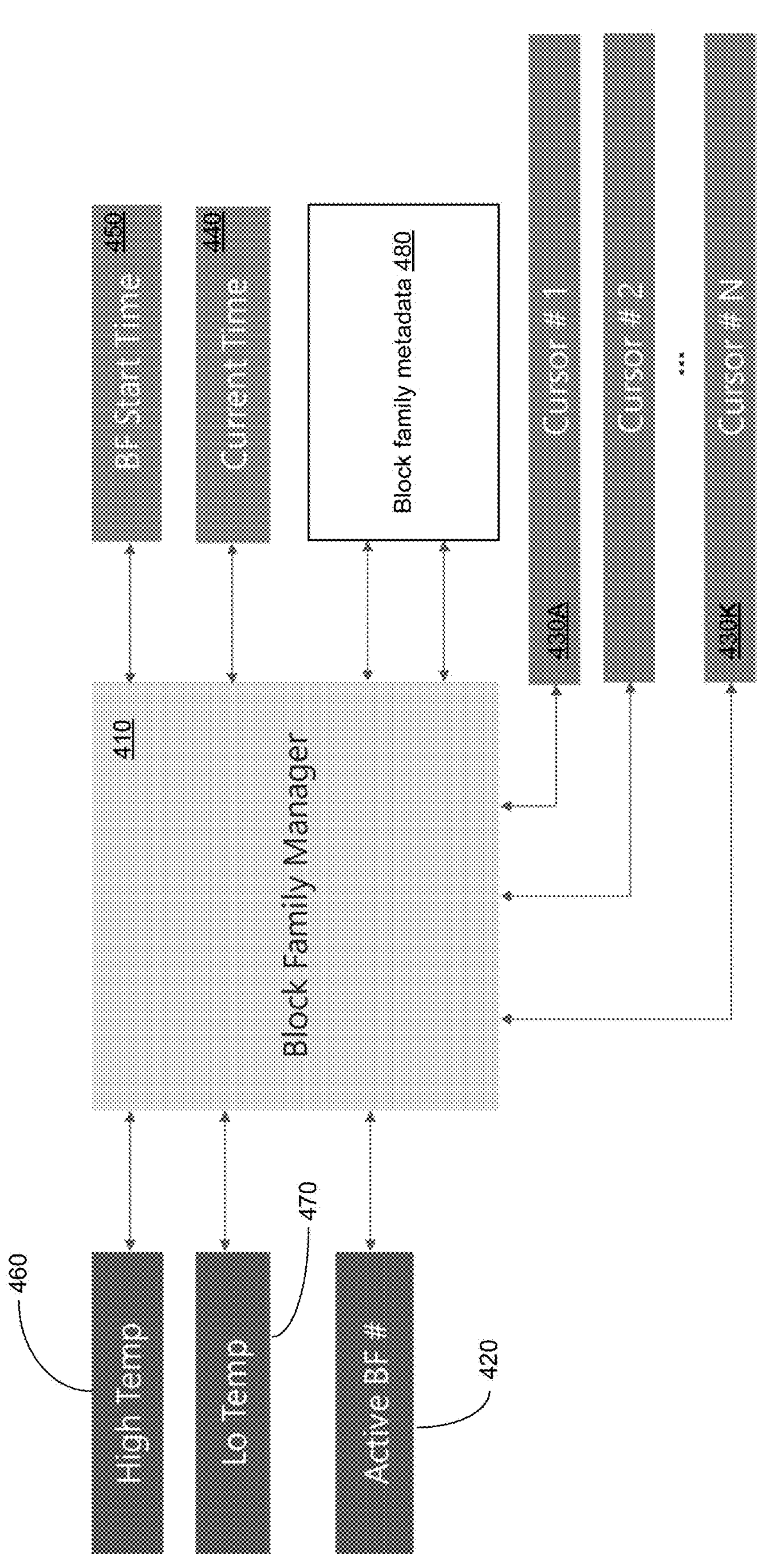
FIG. 4 schematically illustrates block family management operations implemented by the block family manager of the memory-sub-system controller operating in accordance with implementations of the present disclosure.

FIG. 4 schematically illustrates block family management operations implemented by the block family manager of the memory-sub-system controller operating in accordance with implementations of the present disclosure. As schematically illustrated by FIG. 4, the block family manager 410 may maintain, in a memory variable, an identifier 420 of the active block family, which is associated with one or more blocks of cursors 430A-430K as they are being programmed. "Cursor" herein refers to pointer to a location on the memory device to which the data is being written. In an illustrative example, one or more host cursors may be associated with respective data streams being written to the memory device by the host. In another illustrative example, one or more system cursors may be utilized by the memory sub-system controller and/or local media controller for respective data streams being written to the memory device by the controller (e.g., for performing various media management operations, such as garbage collection or folding).

The memory sub-system controller may utilize a power on minutes (POM) clock for tracking the creation times of block families. In some implementations, a less accurate clock, which continues running when the controller is in various low-power states, may be utilized in addition to the POM clock, such that the POM clock is updated based on the less accurate clock upon the controller wake-up from the low-power state.

Thus, upon initialization of each block family, the current time 440 is stored in a memory variable as the block family start time 450. As the blocks are programmed, the current time 440 is compared to the block family start time 450. Responsive to detecting that the difference of the current time 440 and the block family start time 450 is greater than or equal to the specified time period (e.g., a predetermined number of minutes), the memory variable storing the active block family identifier 420 is updated to store the next block family number (e.g., the next sequential integer number), and the memory variable storing the block family start time 450 is updated to store the current time 440.

The block family manager 410 may also maintain two memory variables for storing the high and low reference temperatures of a selected die of each memory device. Upon initialization of each block family, the high temperature 460 and the low temperature 470 variable store the value of the current temperature of the selected die of the memory device. In operation, while the active block family identifier 420 remains the same, temperature measurements are periodically obtained and compared with the stored high temperature 460 and the low temperature 470 values, which are updated accordingly: should the temperature measurement be found to be greater than or equal to the value stored by the high temperature variable 460, the latter is updated to store that temperature measurement; conversely, should the temperature measurement be found to fall below the value stored by the low temperature variable 470, the latter is updated to store that temperature measurement.

The block family manager 410 may further periodically compute the difference between the high temperature 460 and the low temperature 470. Responsive to determining that the difference between the high temperature 460 and the low temperature 470 is greater than or equal to a specified temperature threshold, the block family manager 410 may create a new active block family: the memory variable storing the active block family identifier 420 is updated to store the next block family number (e.g., the next sequential integer number), the memory variable storing the block family start time 450 is updated to store the current time 440, and the high temperature 460 and the low temperature 470 variables are updated to store the value of the current temperature of the selected die of the memory device.

At the time of programming a full or partial block, the memory sub-system controller associates the block (or its partition) with the currently active block family. In an illustrative example, since the programming is done on the page level, one subset of pages (partition) of a block may be programmed within a time period associated with one block family, while the next partition of the block may be programmed within the next time period, which is associated with another block family, etc. Accordingly, the association of each full or partial block with a corresponding block family is reflected by the block family metadata 480, which may be include metadata tables 350, 610-630, and/or 810, as described in more detail herein below.

As noted herein above, based on periodically performed scan operations, the memory sub-system controller associates each die family of every block family with a voltage offset bin, which defines a set of read voltage offsets to be applied to the base voltage read level in order to perform read operations. The scan operations may involve performing, with respect to at least a subset of blocks of a selected partition of a chosen block family, read operations utilizing different read voltage offsets, and choosing the read voltage offset that minimizes the error rate of the read operation.

Figure 5:
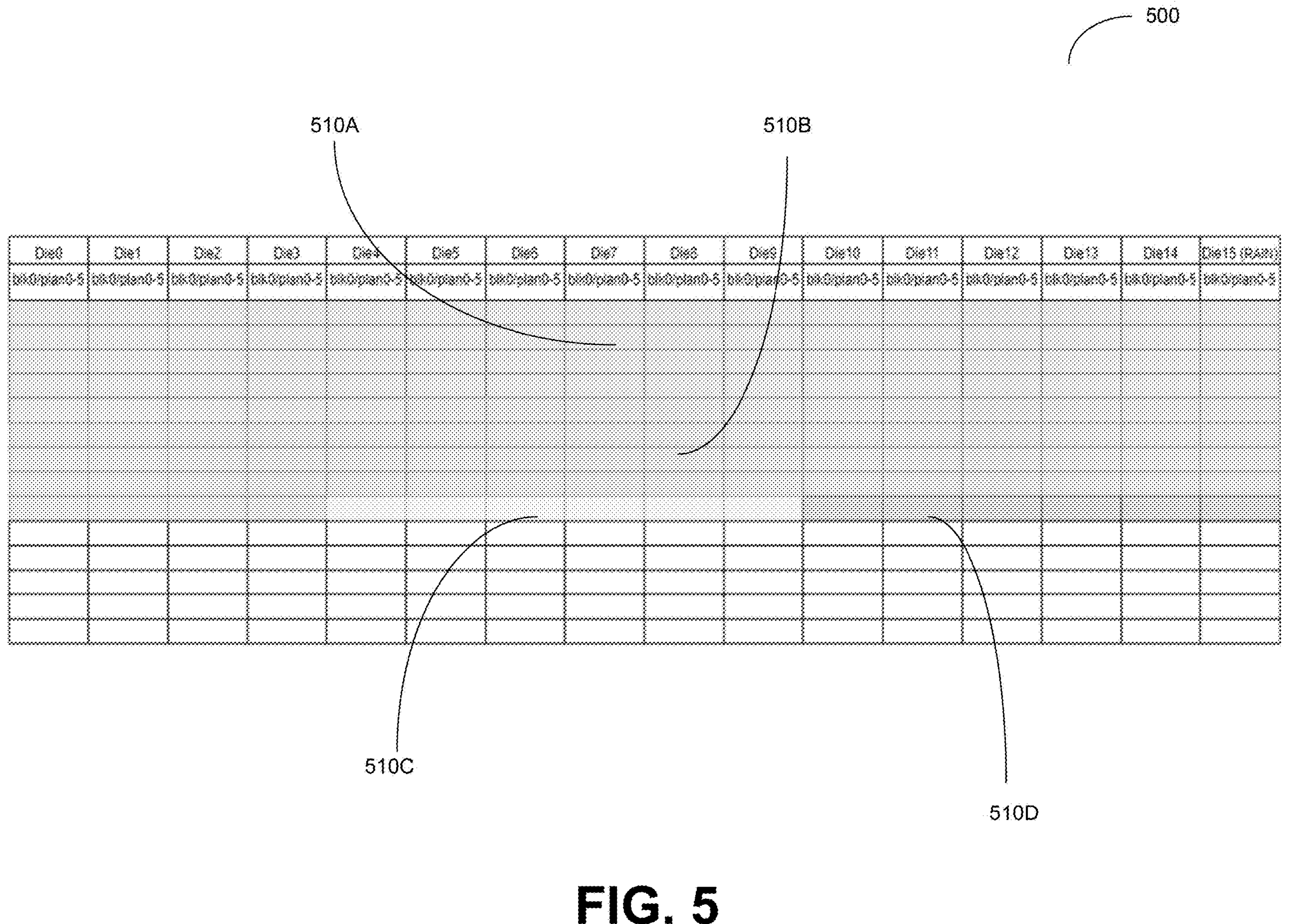
FIG. 5 schematically illustrates superblock partitions that include partial page stripes, in accordance with implementations of the present disclosure.

As noted herein above, in some implementations, no padding for partial page stripes may be allowed due to application-specific requirements. Accordingly, some superblock partitions may include partial pages stripes, as schematically illustrated by FIG. 5, which schematically illustrates superblock partitions associated with respective block families 510A-510D. Each superblock partition 510A-510D includes at least one partial page stripe.

Figure 6:
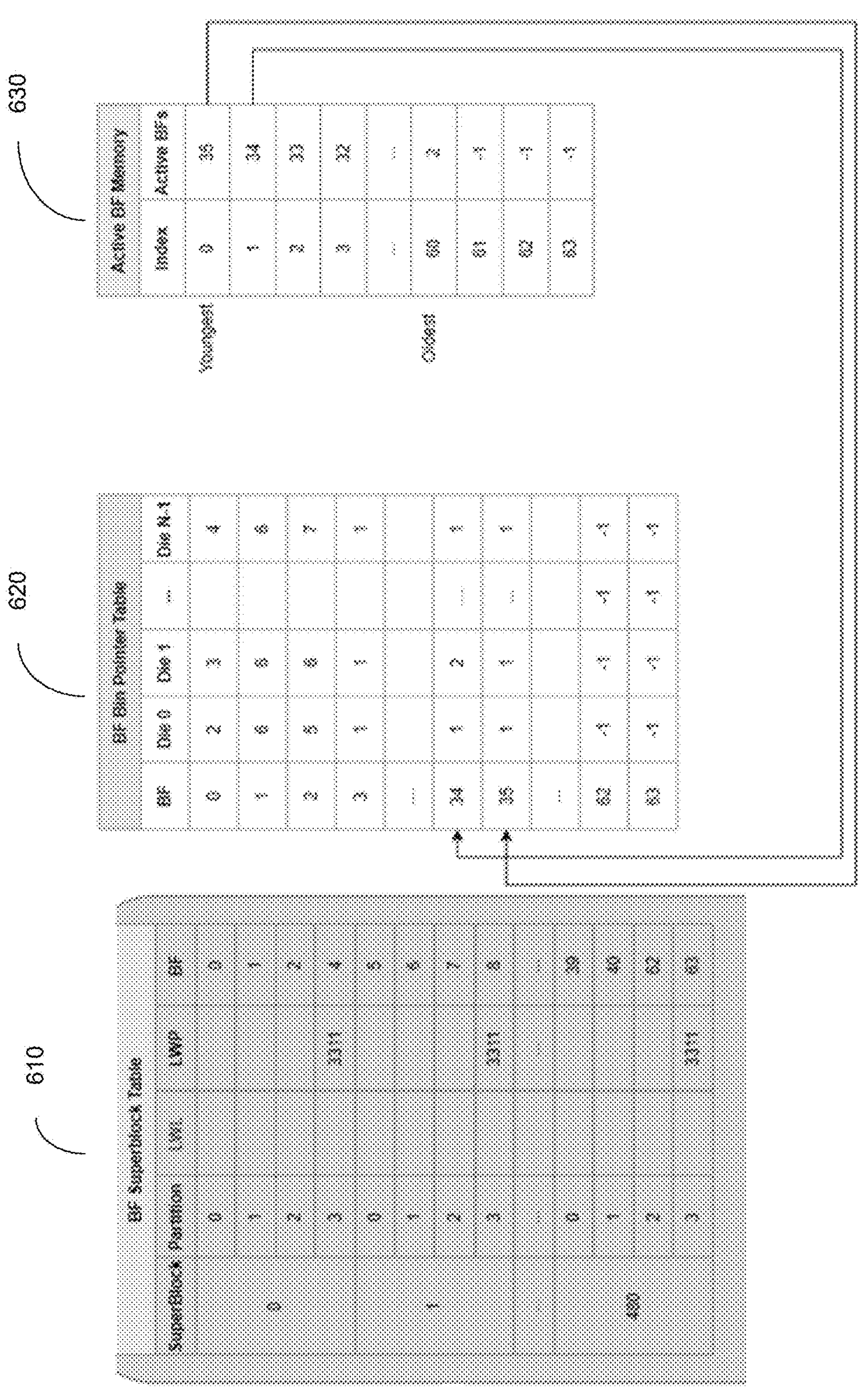
FIG. 6 schematically illustrates example metadata maintained by the memory sub-system controller for implementing block family error avoidance (BFEA) techniques, in accordance with implementations of the present disclosure.

FIG. 6 schematically illustrates example metadata maintained by the memory sub-system controller for implementing BFEA techniques, in accordance with implementations of the present disclosure. As noted herein above, since the programming is done on the page level, one subset of superpages (partition) of a superblock may be programmed within a time period associated with one block family, while the next partition of the superblock may be programmed within the next time period, which is associated with another block family, etc. Accordingly, the superblock table 610 maintained by the memory sub-system controller is indexed by the combination of superblock identifier (e.g., superblock number) and partition identifier (e.g., partition number).

Furthermore, as a superblock partition may include partial pages stripes, the superblock table 610 also stores, for each partition of each superblock, the identifiers (e.g., numbers) of the last written page (LWP) and the last written die (also referred to as "logical unit") (LWL)

Thus, a given record of the superblock table 610 specifies, for the combination of the superblock identifier and partition identifier referenced by the given record, an identifier of the block family associated with the partition of the superblock.

The first partition of a given superblock starts at the page that immediately follows the last page of the last partition of the preceding superblock. Any other partition of a given superblock starts at the page that immediately follows the last page of the preceding partition of the given superblock. Conversely, the partition ends at the page identified by the LWP entry residing on the die identified by the LWL entry of the record of the superblock table 610.

The bin pointer table 620 is indexed by the block family number, such that each record of the bin pointer table 620 specifies, for the block family referenced by the index of the record, a set of voltage offset bins associated with respective dies of the block family. In other words, each record of the bin pointer table 620 includes a vector, each element of which specifies the voltage offset bin associated with the die referenced by the index of the vector element. The voltage offset bins to be associated with the block family dies may be determined by the scan operations, as described in more detail herein above.

In some implementations, one or more logical units (e.g., dies) of a memory device that exhibit similar charge loss-related behavior may be combined to form a die family, thus allowing to combine respective columns of the bin pointer table 620. Accordingly, all references to "die family" in this disclosure should be interpreted as referencing a set of one or more dies.

In some implementations, the block family identifiers (numbers) from a predefined range are re-used by the controller. Accordingly, the controller may maintain the active block family table 630, which maps the block family index to a corresponding block family identifier represented by a number from a predefined range. The indexes are assigned to block families in a manner guaranteeing that the youngest (i.e., the currently active) block family has always the minimum index (e.g., 0) which is, at the time of creation of the block family, is mapped to the first available block family number. Upon creating a new block family, all indices are incremented by one, such that the previous youngest block family receives the index of 1, the second previous youngest block family receives the index of 2, etc.

In some implementations, a memory sub-system may implement a fault tolerant redundancy scheme, such as a redundant array of independent NAND (RAIN), for error checking and correction. A fault tolerant redundancy scheme may involve storing the data in groups of pages ("page stripes"), such that each page stripe includes a redundancy metadata page (e.g., a parity page), thus enabling for the data to be reconstructed if one of the pages of the stripe fails.

In an illustrative example, as the host-originated data received, the controller may program the pages of the memory device to form fault tolerant stripes. Each fault tolerant stripe may include multiple data pages, while the last page of the fault tolerant stripe is dedicated to storing the redundancy metadata, which may be utilized for error detection and correction. Such a fault tolerant stripe may be formed utilizing multiple pages having sequential page numbers from every plane of every die of at least a subset of dies of the memory device.

In some implementations, the redundancy metadata may be computed by summing, e.g., by the exclusive disjunction (XOR) operation, the contents of the pages as the pages are being programmed (i.e., as the contents of the pages is stored to the memory device), and the intermediate result of XOR operations may be stored in a memory until the fault tolerant stripe is closed (i.e., until the metadata is written to the last page of the fault tolerant stripe). After the last data page of the fault tolerant stripe is programmed, the XOR result may be written to the memory device. Such a redundancy scheme would provide fault tolerance in situations when no more than one page of a given fault tolerant stripe is faulty. The faulty page may be reconstructed by performing bitwise exclusive disjunction of all remaining data pages and the metadata page.

Figure 7:
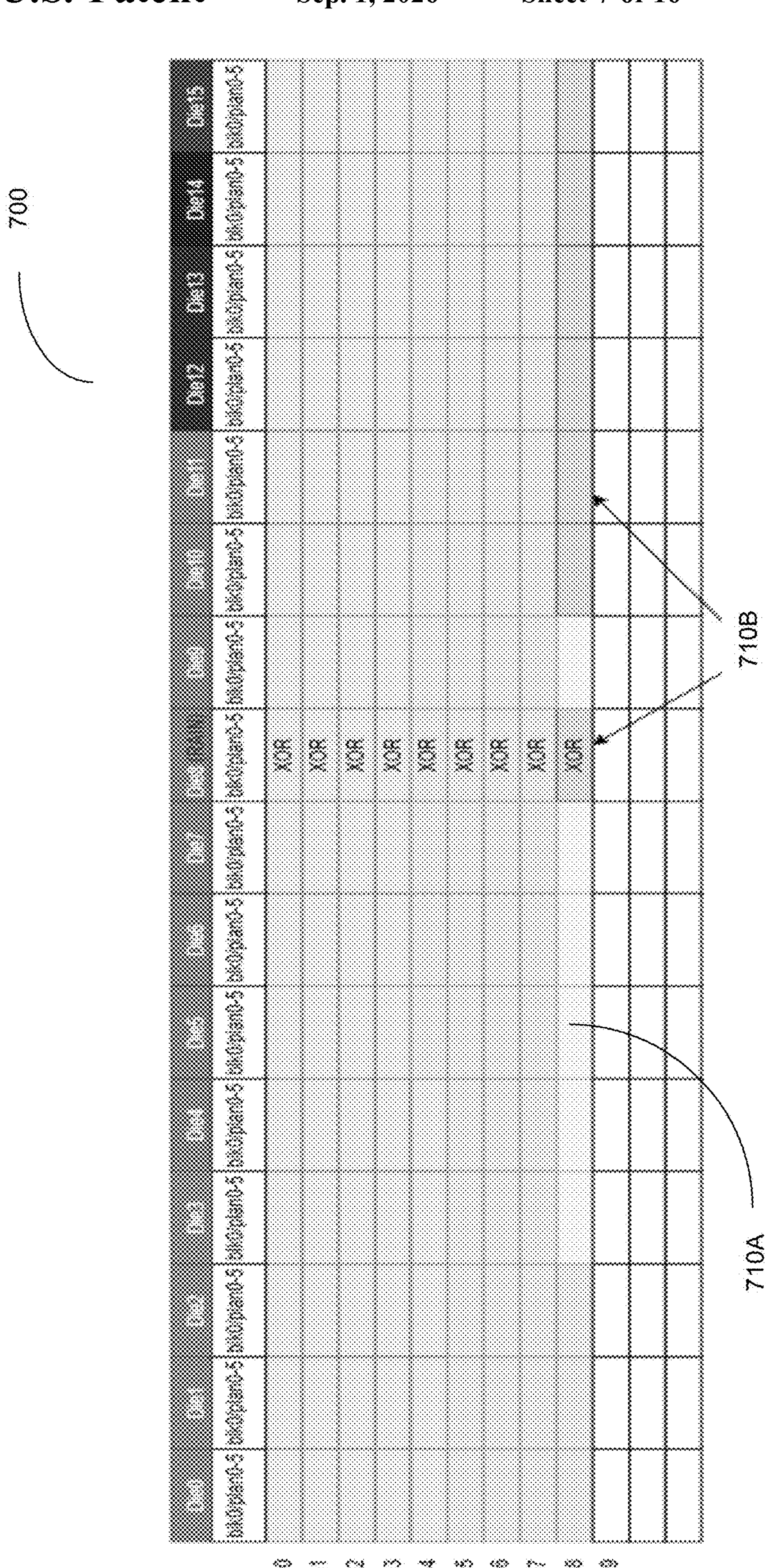
FIG. 7 schematically illustrates an example portion of a logical layout of a memory device operating in accordance with aspects of the present disclosure.

FIG. 7 schematically illustrates an example portion 700 of a logical layout of a memory device operating in accordance with aspects of the present disclosure. As schematically illustrated by FIG. 7, one of the dies, e.g., die 7, may be reserved for storing the redundancy metadata for each block stripe. However, a situation may occur when one portion of a page stripe belongs to one partition (e.g., partition 710A), while another portion of the page stripe including the redundancy metadata page belongs to another partition (e.g., partition 710B).

Figure 8:
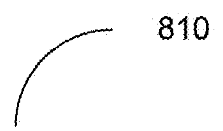
FIG. 8 schematically illustrates an example superblock table maintained by the memory sub-system controller for implementing block family error avoidance (BFEA) techniques, in accordance with implementations of the present disclosure.

In order to accommodate such situations, the superblock table 810 of FIG. 8 includes "Add LUN" column 820 and "Delete LUN" column 830, where LUN refers to a "logical unit number," which is an identifier of a logical unit (e.g., a die) of the memory device, as schematically illustrated by FIG. 8. The logical unit specified by column 820 of a given line of the superblock table 810 is appended to the partition corresponding to the given line of the superblock table 810, while the logical unit specified by column 830 is excluded from the partition (and may be added to another partition corresponding to another line of the superblock table 810). This mechanism allows a partition to include a non-contiguous set of super-pages, and thus accommodates a situation when one portion of a page stripe belongs to one partition (e.g., partition 810A of FIG. 8), while another portion of the page stripe including the redundancy metadata page belongs to another partition (e.g., partition 810B of FIG. 8).

Similarly to the superblock table 610 of FIG. 6, the superblock table 810 is indexed by the combination of superblock identifier (e.g., superblock number) and partition identifier (e.g., partition number). The superblock table 810 also stores, for each partition of each superblock, the identifiers (e.g., numbers) of the last written page (LWP) and the last written die (also referred to as "logical unit") (LWL)

Thus, a given record of the superblock table 810 specifies, for the combination of the superblock identifier and partition identifier referenced by the given record, an identifier of the block family associated with the partition of the superblock.

The first partition of a given superblock starts at the page that immediately follows the last page of the last partition of the preceding superblock. Any other partition of a given superblock starts at the page that immediately follows the last page of the preceding partition of the given superblock. Conversely, the partition ends at the page identified by the LWP entry residing on the die identified by the LWL entry of the record of the superblock table 810.

Furthermore, as noted herein above, the logical unit (e.g., die) specified by column 820 of a given line of the superblock table 810 is appended to the partition corresponding to the given line of the superblock table 810, while the logical unit (e.g., die) specified by column 830 is excluded from the partition.

The metadata tables (e.g., tables 350, 610-630, and 810) may be stored in the metadata areas of one or more memory devices 130. In some implementations, at least part of the metadata tables may be cached in the local memory 119 of the memory sub-system controller 115 and/or local media controller 135.

Figure 9:
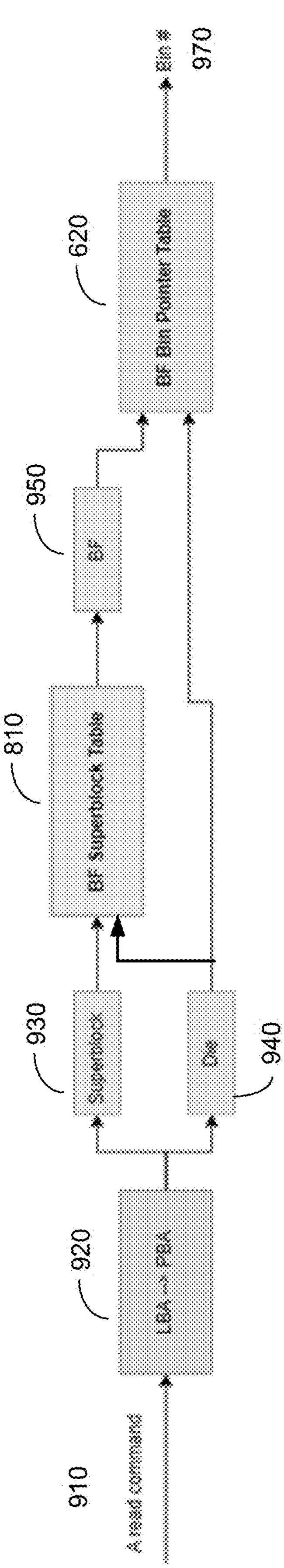
FIG. 9 schematically illustrates an example sequence of operations performed by the memory sub-system controller for implementing block family error avoidance (BFEA) techniques, in accordance with implementations of the present disclosure.

Accordingly, as schematically illustrated by FIG. 9, upon receiving a read command 910, the memory sub-system controller determines (operation 920) the physical address corresponding to the logical block address (LBA) specified by the read command. Components of the physical address, such as the superblock number 930, the page number, and the die identifier 940, are utilized for performing the metadata table walk.

First, the superblock table 810 is used to determine the block family identifier 950 corresponding to the superblock number 930, the page number, and the LUN (e.g., the die number) 940. Then, the block family identifier 950 is used as the index to the bin pointer table 620 in order to identify the voltage offset bin 970 associated with the block family and the die; finally, the identified voltage offset bin 970 is used as the index to the bin offset table 350 in order to determine the read voltage offset corresponding to the bin 970. The memory sub-system controller may then additively apply the identified read voltage offset to the base voltage read level in order to perform the requested read operation.

FIG. 10 is a flow diagram of an example method of performing a read operation by a memory sub-system controller and/or local media controller operating in accordance with some implementations of the present disclosure. The method 1000 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 1000 is performed by the block family manager 113 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 1010, the processing device implementing the method receives a read command specifying a logical address of a page to be read. The logical address may include a logical block address (LBA) of the logical block containing the page, and the page number within the block.

At operation 1020, the processing device translates the logical address into the corresponding physical address (PA). In an illustrative example, the translation involves looking up the LBA in a logical-to-physical (L2P) table associated with the memory device. The L2P table includes multiple mapping records, such that each mapping record maps an LBA to a corresponding physical block address. In an illustrative example, the physical address may include e.g., the superblock identifier, the page identifier, and the LUN (e.g., die identifier and/or plane identifier).

At operation 1030, the processing device identifies, based on block family metadata (e.g., the superblock table 810) associated with the memory device, the superblock partition associated with the superblock number, the page number, and the die. In an illustrative example, in order to identify the block family, the processing device utilizes the superblock table 810, as described in more detail herein below.

At operation 1040, the processing device identifies, based on block family metadata (e.g., the superblock table 810) associated with the memory device, the block family associated with the superblock partition identified at operation 1030, as described in more detail herein below.

At operation 1050, the processing device identifies the read voltage offset associated with the block family and the memory device die. In an illustrative example, the processing device utilizes the bin pointer table 620 in order to determine the bin identifier corresponding to the combination of the block family identifier and the die identifier. The processing device then utilizes the offset table 350 in order to determine the read voltage offsets for the identified voltage offset bin.

At operation 1060, the processing device computes a modified read voltage by applying the identified voltage offset to the base read level associated with the memory device. As noted herein above, the base read level may be stored in the metadata area of the memory device.

At operation 1070, the processing device utilizes the computed modified read voltage in order to perform the requested read operation.

Figure 11:
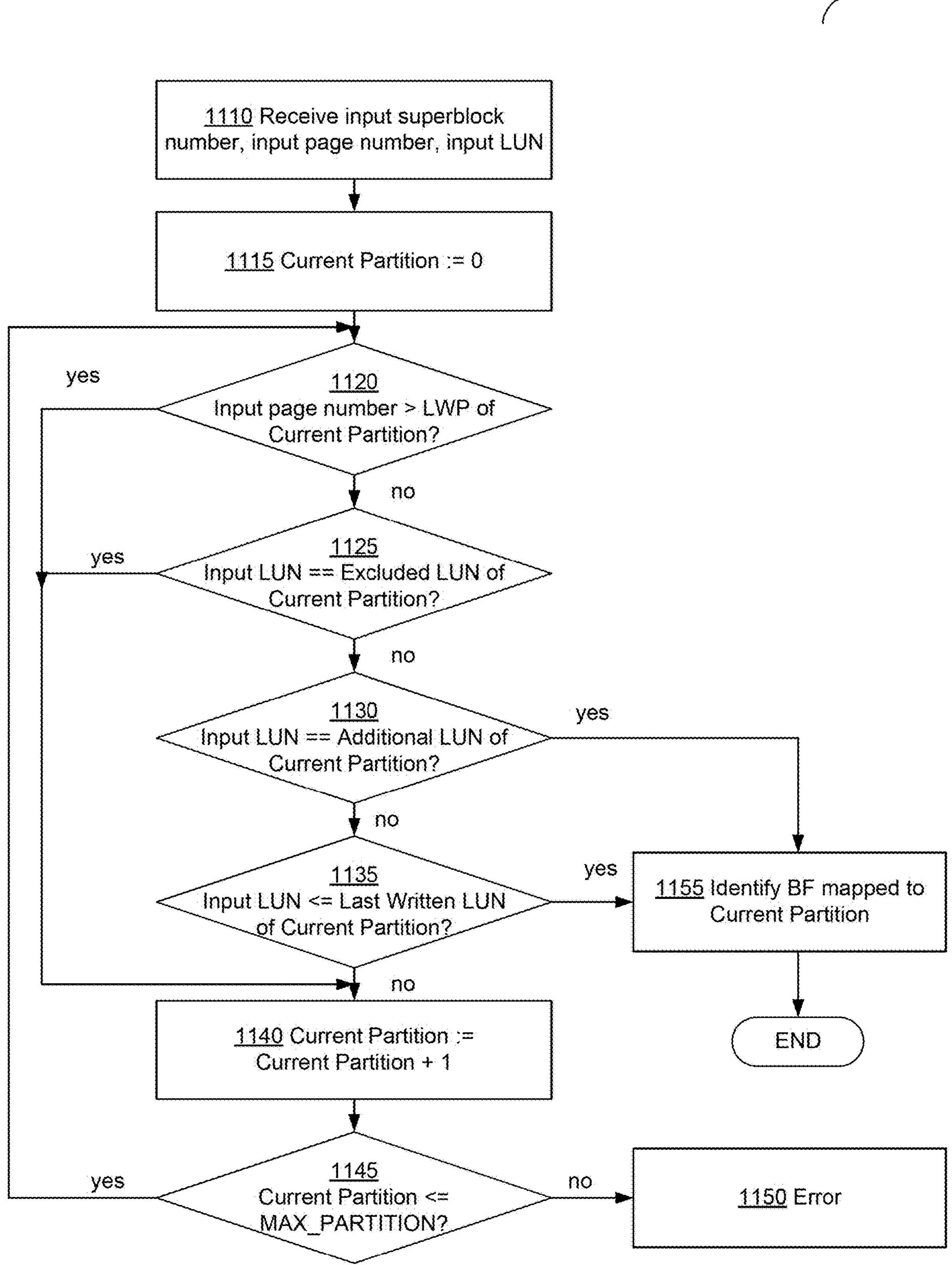
FIG. 11 is a flow diagram of an example method of identifying the block family associated with a specified page, implemented by a memory sub-system controller and/or local media controller operating in accordance with some implementations of the present disclosure.

FIG. 11 is a flow diagram of an example method of identifying the block family associated with a specified superblock, LUN (e.g., die), and page, implemented by a memory sub-system controller and/or local media controller operating in accordance with some implementations of the present disclosure. The method 1100 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 1100 is performed by the block family manager 113 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 1110, the processing device implementing the method receives the input superblock number, the input page number, and the input LUN (e.g., the die number). In an illustrative example, the input superblock number and the input LUN may be produced by the flash translation layer based on an LBA specified by a read command received by the memory sub-system controller, as described in more detail herein above.

At operations 1115-1145, the processing device iterates through the partitions of the superblock identified by the input superblock number received at operation 1110, until a partition associated with the page identified by the page number is found.

Accordingly, at operation 1115, the processing device initializes the current partition number with the value of the minimum partition number (e.g., 0).

At operation 1120, the processing device retrieves, from the superblock table (e.g., superblock table 810), the last written page number of the current partition and compares it to the input page number received at operation 1110. Responsive to determining that the input page number exceeds the last written page number, the next iteration of the method is initiated at operation 1140.

At operation 1125, the processing device retrieves, from the superblock table, the excluded LUN (e.g., specified by the "Delete LUN" field 830 of the superblock table 810) of the current partition and compares it to the input LUN (e.g., die identifier) received at operation 1110. Responsive to determining that the input LUN matches the excluded LUN of the current partition, the next iteration of the method is initiated at operation 1140.

At operation 1130, the processing device retrieves, from the superblock table, the additional LUN (e.g., specified by the "Add LUN" field 820 of the superblock table 810) of the current partition and compares it to the input LUN (e.g., die identifier) received at operation 1110. Responsive to determining that the input LUN matches the additional LUN of the current partition, the processing continues at operation 1155.

At operation 1135, the processing device retrieves, from the superblock table, the last written LUN of the current partition and compares it to the input LUN (e.g., die identifier) received at operation 1110. If the last written LUN is not specified by the superblock table, it is assumed to be equal to the maximum LUN of the memory device. Responsive to determining that the input LUN does not exceed the last written LUN, the processing continues at operation 1155.

At operation 1140, the processing device increments the current partition number.

At operation 1145, the processing device compares the current partition number to the maximum number of partitions supported by the memory device. Responsive to determining that the current partition number does not exceed the maximum number of partitions, the method loops back to operation 1120; otherwise, at operation 1150, the method terminates with an error indicating that the superblock table is likely to be corrupted.

At operation 1155, the processing device identifies the block family that is mapped, by a record of the superblock table, to the current partition number, and the method terminates.

As noted herein above, as the superblock partitions may not be aligned with page stripes, some of block families may have no pages residing on some dies, and thus such block families would have no valid read voltage offsets defined for such dies. Therefore, as schematically illustrated by FIG. 12, two given block families (denoted BF0 and BF1) may have fully overlapping sets of dies families of the memory device (as shown by table 1210A), partially overlapping sets of die families of the memory device (table 1210B), or non-overlapping sets of die families of the memory device (as shown by table 1210C).

In the illustrative example of FIG. 12, each of the tables 1210A-1210C shows, for each die family (denoted DF0-DF4) of the memory device, respective voltage offset bin assignments for each of block families BF0 and BF1. In tables 1210A-1210C, Bin0_i refers to the read voltage offset associated with the voltage offset bin assigned to block family BF0 for i-th die family, and Bin1_i refers to the read voltage offset associated with the voltage offset bin assigned to block family BF1 for i-th die family.

In particular, table 1210A shows an example of fully overlapping sets of die families shared by two block families, such that each of the block families BF0 and BF1 has memory pages residing on each of the die families DF0-DF4 and thus has respective voltage offset bins assigned to each of the die families DF0-DF4.

Conversely, table 1210B shows an example of partially overlapping sets of die families shared by two block families, such that each of the block families BF0 and BF1 has memory pages residing on die families DF2 and DF3; however, block family BF0 has no memory pages residing on die families DF0 and DF4, and thus has no voltage offset bins assigned for those die families. Similarly, block family BF1 has no memory pages residing on die families DF1 and DF4, and thus has no voltage offset bins assigned for those die families. A predefined number (e.g., −1) may be utilized in each situation when a block family has no memory pages residing on a given die family, and thus has no voltage offset bins assigned for that die family.

Similarly, table 1210C shows an example of non-overlapping sets of die families of two block families, such that block family BF0 has memory pages residing on die family DF1, while block family BF1 has memory pages residing on die families DF0, DF2, and DF3. Therefore, block family BF0 has no memory pages residing on die families DF0, DF2, DF3, and DF4, and thus has no voltage offset bins assigned for those die families. Similarly, block family BF1 has no memory pages residing on die families DF1 and DF4, and thus has no voltage offset bins assigned for those die families. A predefined number (e.g., −1) may be utilized in each situation when a block family has no memory pages residing on a given die family, and thus has no voltage offset bins assigned for that die family.

The last line of each of tables 1210A-1210C shows, in each die family column, the corresponding absolute difference between the voltage offsets corresponding to the voltage offset bins assigned to each of the block family.

As noted herein above, if two block families have no overlapping dies (or die families), those block families may be combined provided that the minimum absolute voltage offset of one of the block families matches the minimum absolute voltage offset of the other block family. The predefined number (e.g., −1) that is used for denoting the non-existent voltage offset bins (e.g., when a block family has no memory pages residing on a given die, and thus has no voltage offset bins assigned for that die) should be excluded when computing the minimum absolute voltage offsets for the block families.

Conversely, if two block families have at least partially overlapping sets of dies, those two block families may be merged provided that the value of the chosen similarity metric for the two block families does not exceed a chosen similarity threshold.

In an illustrative example, the similarity metric reflects the maximum, across all dies (or die families), pairwise absolute difference between the calibrated values of the read voltage offsets associated with each of the block families for a given die (or a die family):

$$\text{Similarity} = \max\{|\text{Bin0\_i} - \text{Bin1\_i}|,\ i = 1, \ldots n\}$$

where n is the number of dies (or die families) of the memory device.

The value of the similarity threshold may be chosen to minimize the read error rate of the memory device while keeping the number of active block families under a predefined maximum number.

In an illustrative example, merging two block families may involve forming a new block family that would include all superblock partitions of the two block families. In an illustrative example, merging two block families may involve appending all superblock partitions of one block family to another block family. Upon merging two block families, the block family metadata (e.g., the superblock table 810 and the bin pointer table 810) may be updated accordingly.

In some implementations, the memory sub-system controller may iterate through all possible pairs of the active block families of the memory device in order to identify block family pairs that can be merged.

Figure 13:
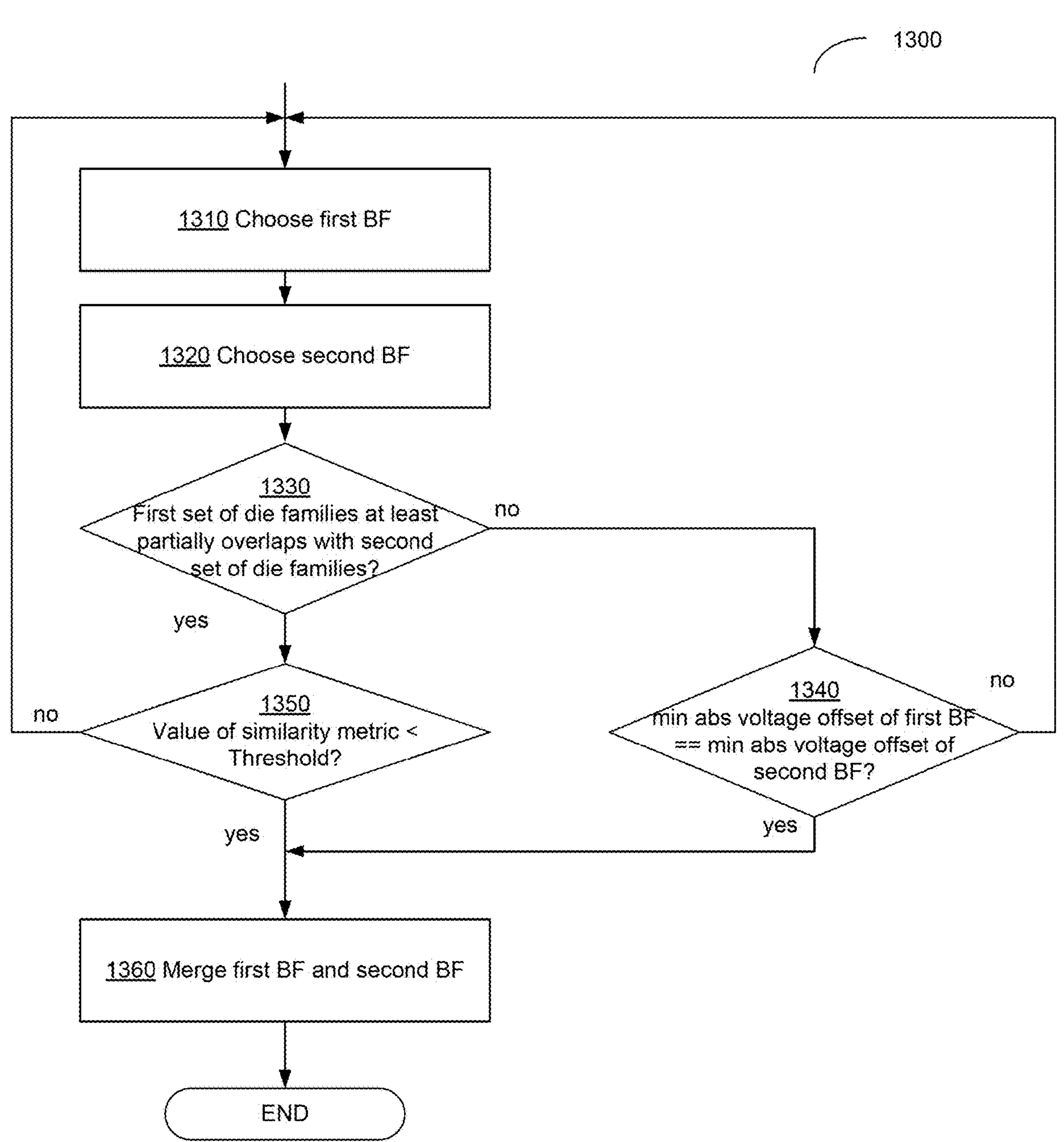
FIG. 13 is a flow diagram of an example method of merging block families in a memory device, implemented by a memory sub-system controller and/or local media controller operating in accordance with some implementations of the present disclosure.

FIG. 13 is a flow diagram of an example method of merging block families in a memory device, implemented by a memory sub-system controller and/or local media controller operating in accordance with some implementations of the present disclosure. The method 1300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 1300 is performed by the block family manager 133 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 1310, the processing device implementing the method choses, among the active block families of a memory device, a first candidate block family for merging with another block family. The first block family may comprise a first set of blocks of the memory device that reside on a first set of die families of the memory device and have been programmed within a first time window and/or a first temperature window, as described in more detail herein above.

At operation 1320, the processing device choses, among the active block families of the memory device, a second candidate block family for merging with the first block family. The second block family may comprise a second set of blocks of the memory device that reside on a second set of die families of the memory device and have been programmed within a second time window and/or a second temperature window, as described in more detail herein above.

At operation 1330, the processing device determines whether the first set of die families of the memory device at least partially overlaps with the second set of die families of the memory device. Responsive to determining, at operation 1330, that the first set of die families at least partially overlaps with the second set of die families, the processing continues at operation 1350; otherwise, the method branches to operation 1340.

At operation 1340, the processing device compares the minimum absolute voltage offset of the first block family to the minimum absolute voltage offset of the second block family. Responsive to determining, at operation 1340, that the minimum absolute voltage offset of the first block family is equal to the minimum absolute voltage offset of the second block family, the processing continues at operation 1360; otherwise, the method loops back to operation 1310.

At operation 1350, the processing device determines a value of a chosen similarity metric of the first block family and the second block family. In an illustrative example, the similarity metric reflects the maximum, across all die families of the memory device, pairwise absolute difference between calibrated values of read voltage offsets associated with the first block family and the second block family for each die family of the memory device, as described in more detail herein above. Responsive to determining, at operation 1350, that the value of the similarity metric does not exceed a predefined similarity threshold, the processing device, at operation 1360, merges the first block family and the second block family; otherwise, the method loops back to operation 1310. Merging the first block family and the second block family may involve modifying the block family metadata (e.g., the superblock table 810 and/or the bin pointer table 620), as described in more detail herein above.

Responsive to completing the operation 1360, the method terminates.

As noted herein above, the memory sub-system controller may periodically perform scan operations in order to associate each die of every block family with one of the predefined voltage offset bins, which is in turn associated with the voltage offset to be applied for read operations. The scan operations may involve performing, with respect to at least a subset of blocks of a selected superblock partition of a chosen block family, read operations utilizing different read voltage offsets, and choosing the read voltage offset that minimizes the error rate of the read operation.

In some implementations, the scan operations are performed periodically (e.g., triggered by a timer) and, for each voltage offset bin of a set of voltage offset bins maintained by the memory device, a predefined number of the oldest (i.e., least recently closed) block families associated with that voltage offset bin are selected for the scan iteration.

From a selected block family, one or more superblock partitions may be selected for scanning. In some implementations, one or more superblock partitions may be selected for scanning, such that each selected superblock partition would cover all the die families of the selected block family (i.e., includes at least one block in each die family). If the number of such superblock partitions falls below the predefined number of superblock partitions to be selected for scanning, at least some of the superblock partitions may be scanned multiple times. In some implementations, the list of candidate superblock partitions may be treated as a circular list, such that the first element of the list would follow the last element of the list. Accordingly, assuming that three superblock partitions need to be selected from the list containing superblock partitions P0 and P1, the superblock partition scanning sequence would be P0, P1, P0. Conversely, if the list of candidate superblock partitions only includes one superblock partition P0, the superblock partition scanning sequence would be P0, P0, P0.

If the selected block family includes multiple superblock partitions each of which covers all the die families of the selected block family, and the number of such superblock partitions exceeds the predefined number of superblock partitions to be selected for scanning, a priority-based selection technique may be implemented for selecting one or more superblock partitions for scanning. In an illustrative example, the priority-based scheme may assign the selection priorities to superblock partitions based on their characteristics, such as whether or not a given superblock partition is mapped to a whole block stripe, the presence of certain specified wordlines in the partition layout, etc.

Conversely, a situation may occur when the selected block family has no single superblock partition that would cover all die families of the selected block family. In such a situation, a combination of two or more superblock partitions may be selected for scanning. Accordingly, the memory sub-system controller may iterate through all possible combinations of superblock partitions that are associated with the selected block family in order to identify a combination of two or more superblock partitions may be selected for scanning, such that the union of die families of the selected superblock partitions would include all the die families of the selected block family.

Figure 14:
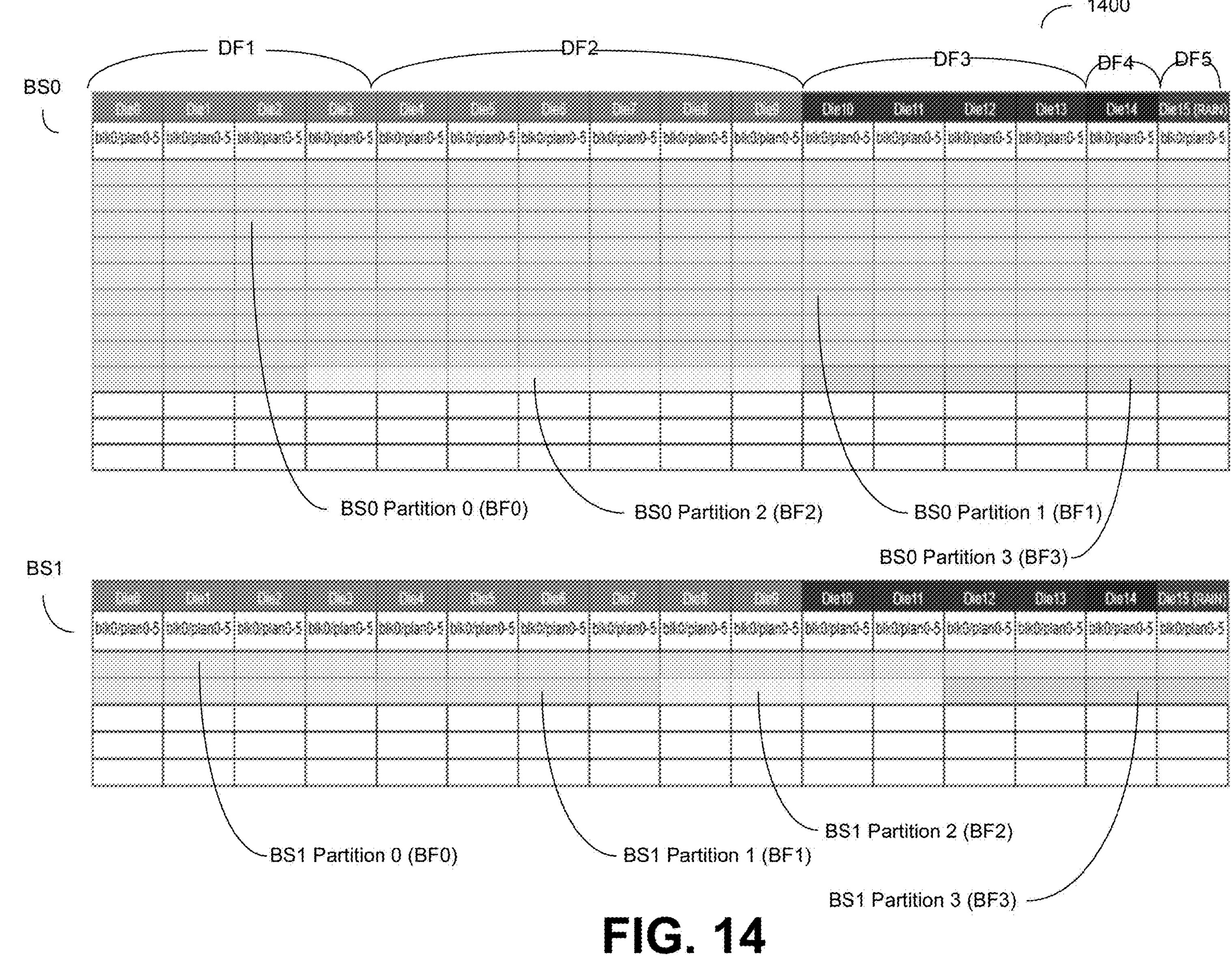
FIG. 14 schematically illustrates an example portion of a logical layout of a memory device operating in accordance with aspects of the present disclosure.

FIG. 14 schematically illustrates an example portion 1400 of a logical layout of a memory device. The example logical layout 1400 includes two block stripes, denoted BS0 and BS1, the blocks of which are allocated to four block families, denoted BF0-BF3. Assuming that BF2 is selected for scan, two superblock partitions (BS0 Superblock partition 2 and BS1 Superblock partition 2) can be considered. However, none of the two superblock partitions cover all the three die families (DF1-DF3) covered by block family BF2. Accordingly, a combination of the two superblock partitions (BS0 Superblock partition 2 and BS1 Superblock partition 2) may be selected for scanning, since the union of die families of the two superblock partitions includes all the superblock partitions of the selected block family (BF2).

Figure 15:
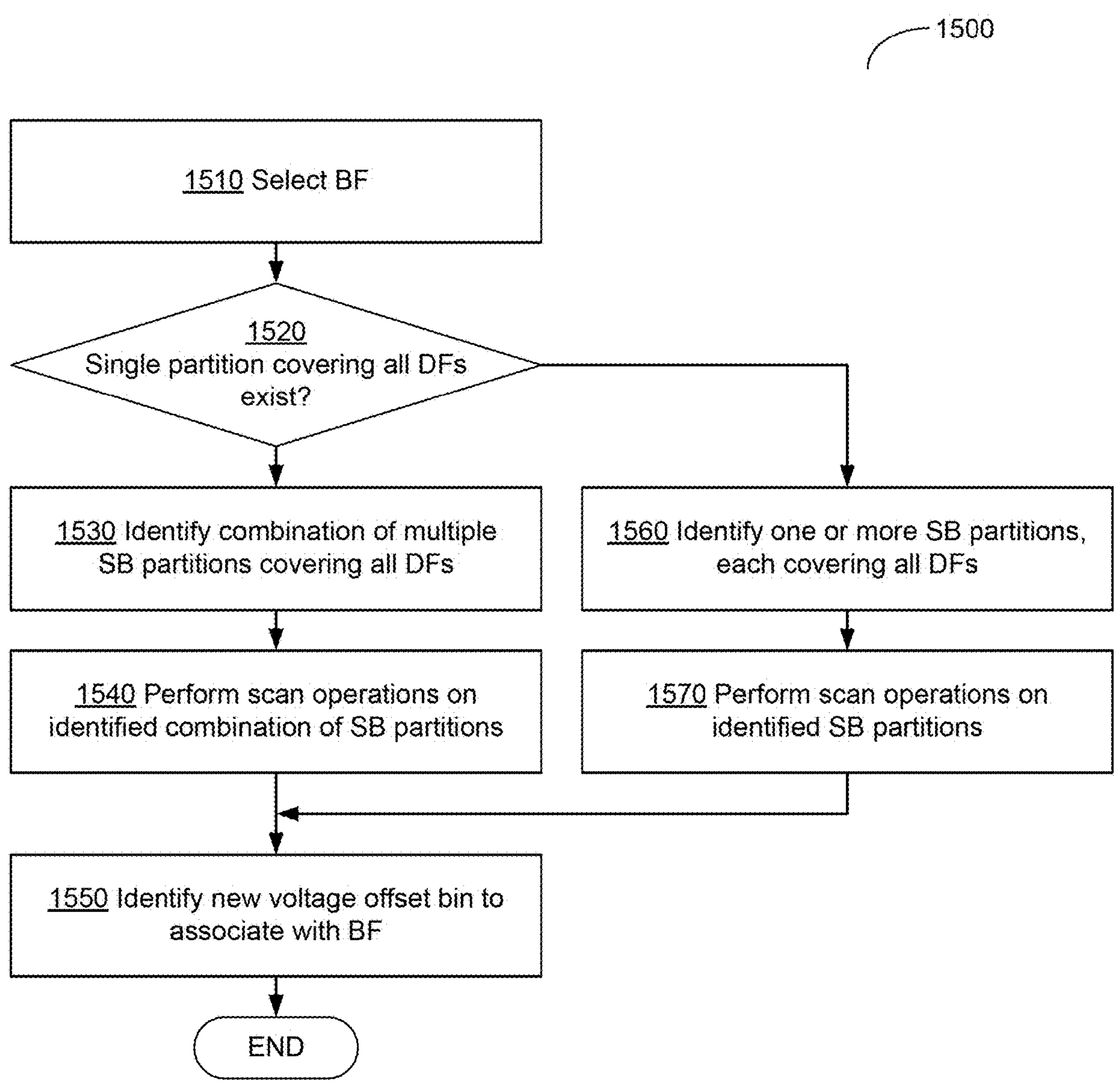
FIG. 15 is a flow diagram of an example method of selecting superblock partition for performing scan operations in a memory device, implemented by a memory sub-system controller and/or local media controller operating in accordance with some implementations of the present disclosure.

FIG. 15 is a flow diagram of an example method of selecting superblock partition for performing scan operations in a memory device, in accordance with some implementations of the present disclosure. The method 1500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 1500 is performed by the block family manager 113 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations. Thus, not all illustrated operations are required in every implementation, and other process flows are possible.

At operation 1510, the processing device implementing the method selects, for scanning, a block family including a plurality of blocks of the memory device. In some implementations, for each voltage offset bin of a set of voltage offset bins maintained by the memory device, the processing device selects a predefined number of the oldest (i.e., least recently closed) block families associated with that voltage offset bin, as described in more detail herein above.

At operation 1520, the processing device determines whether a single superblock partition exists that covers all die families utilized by the plurality of blocks of the memory device. Responsive to determining, at operation 1520, that no superblock partitions associated with the block family cover all die families of the set of die families, the processing continues at operation 1530; otherwise, the method branches to operation 1560.

At operation 1530, the processing device identifies a combination of two or more superblock partitions associated with the block family, such that a union of die families covered by the combination of those superblock partitions includes all die families of the set of die families. Identifying the combination of two or more superblock partitions may involve iterating over a plurality of combinations of superblock partitions associated with the block family, as described in more detail herein above.

At operation 1540, the processing device performs one or more scan operations with respect to the combination of the two or more superblock partitions. Performing each scan operation may involve performing, with respect to at least a subset of blocks of the combination of the two or more superblock partitions, read operations utilizing multiple read voltage offsets. the processing device choose, among the multiple the read voltage offsets, the read voltage offset that minimizes the error rate (e.g., the bit error rate (BER)) of the read operations, as described in more detail herein above.

At operation 1550, the processing device identifies a new voltage offset bin that corresponds to the identified new read voltage offset that minimizes the error rate of the read operations. Upon choosing the new voltage offset bin, the processing device may update the block family metadata tables accordingly, as described in more detail herein above.

Upon performing the operation 1550, the method terminates.

At operation 1560, the processing device selects one or more superblock partitions associated with the block family, such that each selected superblock partition covers all die families of the set of die families. If the number of such superblock partitions exceeds the predefined number of superblock partitions to be selected for scanning, a priority-based selection technique may be implemented for selecting one or more superblock partitions for scanning, as described in more detail herein above.

At operation 1570, the processing device performs one or more scan operations with respect to the selected one or more superblock partitions. Performing each scan operation may involve performing, with respect to at least a subset of blocks of a selected superblock partition, read operations utilizing multiple read voltage offsets. the processing device choose, among the multiple the read voltage offsets, the read voltage offset that minimizes the error rate (e.g., the bit error rate (BER)) of the read operations, as described in more detail herein above.

Upon performing the operation 1570, the method branches to operation 1550.

Figure 16:
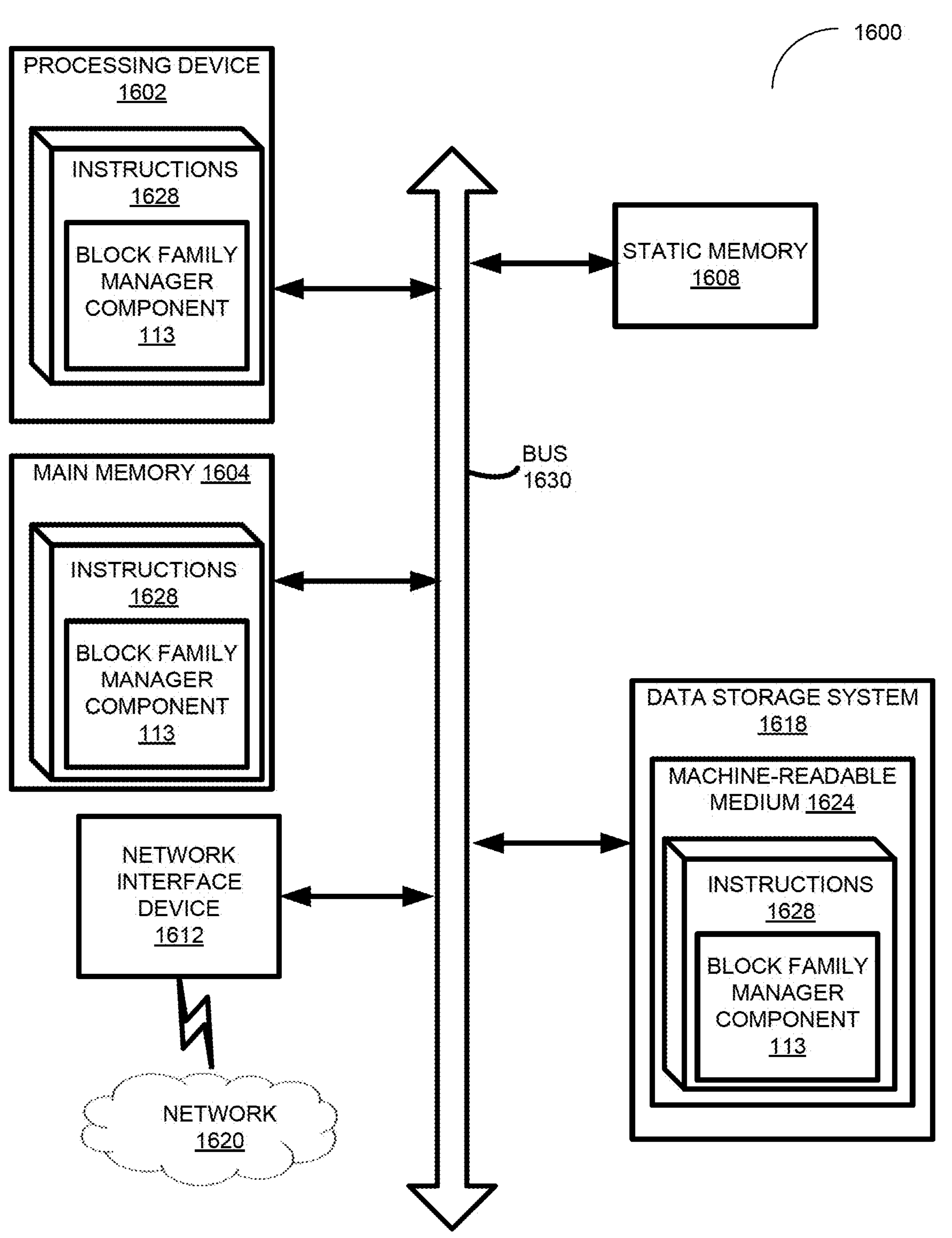
FIG. 16 is a block diagram of an example computer system in which implementations of the present disclosure may operate.

FIG. 16 illustrates an example machine of a computer system 1600 within which a set of instructions, for causing the machine to perform any one or more of the methodologies discussed herein, may be executed. In some implementations, the computer system 1600 may correspond to a host system (e.g., the host system 120 of FIG. 1) that includes, is coupled to, or utilizes a memory sub-system (e.g., the memory sub-system 110 of FIG. 1) or may be used to perform the operations of a controller (e.g., to execute an operating system to perform operations corresponding to the block family manager 113 of FIG. 1). In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1600 includes a processing device 1602, a main memory 1604 (e.g., read-only memory (ROM), flash memory, dynamic random access memory (DRAM) such as synchronous DRAM (SDRAM) or Rambus DRAM (RDRAM), etc.), a static memory 1608 (e.g., flash memory, static random access memory (SRAM), etc.), and a data storage system 1618, which communicate with each other via a bus 1630.

Processing device 1602 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. The processing device 1602 is configured to execute instructions 1628 for performing the operations and steps discussed herein. The computer system 1600 may further include a network interface device 1612 to communicate over the network 1620.

The data storage system 1618 may include a machine-readable storage medium 1624 (also known as a computer-readable medium) on which is stored one or more sets of instructions 1628 or software embodying any one or more of the methodologies or functions described herein. The instructions 1628 may also reside, completely or at least partially, within the main memory 1604 and/or within the processing device 1602 during execution thereof by the computer system 1600, the main memory 1604 and the processing device 1602 also constituting machine-readable storage media. The machine-readable storage medium 1624, data storage system 1618, and/or main memory 1604 may correspond to the memory sub-system 110 of FIG. 1.

In some implementations, the instructions 1628 include instructions to implement functionality corresponding to the block family manager 113 of FIG. 1. While the machine-readable storage medium 1624 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus may be specially constructed for the intended purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:

a memory device; and a processing device, operatively coupled to the memory device, the processing device to perform operations comprising:

receiving a read command specifying an identifier of a logical block and a page number;

translating the identifier of the logical block into a physical address, wherein the physical address comprises an identifier of a superblock and an identifier of a die;

identifying, based on block family metadata associated with the memory device, a first superblock partition associated with the superblock, the page number, and the die;

identifying, based on the block family metadata, a block family associated with the first superblock partition, wherein the block family metadata comprises a first table including a plurality of records, wherein a first record of the plurality of records associates at least a subset of pages of the superblock with the block family, and wherein the first record further specifies a last written page of the superblock and an excluded die of the superblock, wherein the excluded die is added to a second superblock partition identified by a second record of the plurality of records;

determining a read voltage offset associated with the block family and the die;

computing a modified read voltage by applying the read voltage offset to a base read level associated with the die; and reading, using the modified read voltage, data from a physical page identified by the page number within the superblock.

2. The system of claim 1, wherein the block family comprises a plurality of blocks that have been programmed within at least one of: a specified time window or a specified temperature window.

3. The system of claim 1, wherein the first record further specifies a last written die of the superblock.

4. The system of claim 1, wherein the first record further specifies an additional die associated with the superblock.

5. The system of claim 1, wherein the block family metadata comprises a second table including a second plurality of records, wherein a record of the second plurality of records associates a plurality of dies of the block family with respective voltage offset bins.

6. The system of claim 1, wherein the block family metadata comprises a third table including a third plurality of records, wherein a record of the third plurality of records associates a voltage offset bin with one or more read voltage offsets to be applied to respective base voltage read levels for performing read operations.

7. A method, comprising:

receiving, by a processing device, a read command specifying an identifier of a logical block and a page number;

translating the identifier of the logical block into a physical address, wherein the physical address comprises an identifier of a superblock and an identifier of a die;

identifying, based on block family metadata associated with a memory device, a first superblock partition associated with the superblock, the page number, and the die;

identifying, based on the block family metadata, a block family associated with the first superblock partition, wherein the block family metadata comprises a first table including a plurality of records, wherein a first record of the plurality of records associates at least a subset of pages of the superblock with the block family, and wherein the first record further specifies a last written page of the superblock and an excluded die of the superblock, wherein the excluded die is added to a second superblock partition identified by a second record of the plurality of records;

determining a read voltage offset associated with the block family and the die;

computing a modified read voltage by applying the read voltage offset to a base read level associated with the die; and reading, using the modified read voltage, data from a physical page identified by the page number within the superblock.

8. The method of claim 7, wherein the block family comprises a plurality of blocks that have been programmed within at least one of: a specified time window or a specified temperature window.

9. The method of claim 7, wherein the first record further specifies a last written die of the superblock.

10. The method of claim 7, wherein the first record further specifies an additional die associated with the superblock.

11. The method of claim 7, wherein the block family metadata comprises a second table including a second plurality of records, wherein a record of the second plurality of records associates a plurality of dies of the block family with respective voltage offset bins.

12. The method of claim 7, wherein the block family metadata comprises a third table including a third plurality of records, wherein a record of the third plurality of records associates a voltage offset bin with one or more read voltage offsets to be applied to respective base voltage read levels for performing read operations.

13. A computer-readable non-transitory storage medium comprising executable instructions that, when executed by a processing device, cause the processing device to perform operations, comprising:

receiving a read command specifying an identifier of a logical block and a page number;

translating the identifier of the logical block into a physical address, wherein the physical address comprises an identifier of a superblock and an identifier of a die;

identifying, based on block family metadata associated with a memory device, a first superblock partition associated with the superblock, the page number, and the die;

identifying, based on the block family metadata, a block family associated with the first superblock partition, wherein the block family metadata comprises a first table including a plurality of records, wherein a first record of the plurality of records associates at least a subset of pages of the superblock with the block family, and wherein the first record further specifies a last written page of the superblock and an excluded die of the superblock, wherein the excluded die is added to a second superblock partition identified by a second record of the plurality of records;

determining a read voltage offset associated with the block family and the die;

computing a modified read voltage by applying the read voltage offset to a base read level associated with the die; and reading, using the modified read voltage, data from a physical page identified by the page number within the superblock.

14. The computer-readable non-transitory storage medium of claim 13, wherein the block family comprises a plurality of blocks that have been programmed within at least one of: a specified time window or a specified temperature window.

15. The computer-readable non-transitory storage medium of claim 13, wherein the first record further specifies a last written die of the superblock.

16. The computer-readable non-transitory storage medium of claim 13, wherein the first record further specifies an additional die associated with the superblock.

17. The computer-readable non-transitory storage medium of claim 13, wherein the block family metadata comprises a second table including a second plurality of records, wherein a record of the second plurality of records associates a plurality of dies of the block family with respective voltage offset bins.

18. The computer-readable non-transitory storage medium of claim 13, wherein the block family metadata comprises a third table including a third plurality of records, wherein a record of the third plurality of records associates a voltage offset bin with one or more read voltage offsets to be applied to respective base voltage read levels for performing read operations.

* * * * *